US010737988B2

(12) United States Patent
Sanders et al.

(10) Patent No.: US 10,737,988 B2
(45) Date of Patent: Aug. 11, 2020

(54) POLYMER-BORIC ACID COMPOSITIONS

(71) Applicant: Verdesian Life Sciences, LLC, Cary, NC (US)

(72) Inventors: John Larry Sanders, Leawood, KS (US); Jacob Mazo, Wilmette, IL (US); Grigory Mazo, Wilmette, IL (US)

(73) Assignee: Verdasian Life Sciences U.S., LLC, Cary, NC (US)

(*) Notice: Subject to any disclaimer, the term of this patent is extended or adjusted under 35 U.S.C. 154(b) by 34 days.

(21) Appl. No.: 15/063,291

(22) Filed: Mar. 7, 2016

(65) Prior Publication Data
US 2016/0185678 A1 Jun. 30, 2016

Related U.S. Application Data

(63) Continuation of application No. PCT/US2014/054069, filed on Sep. 4, 2014.

(60) Provisional application No. 62/001,330, filed on May 21, 2014, provisional application No. 61/874,025, filed on Sep. 5, 2013.

(51) Int. Cl.
C05G 3/40 (2020.01)
C05D 9/02 (2006.01)
C08K 3/38 (2006.01)
C05C 9/00 (2006.01)
C08F 230/06 (2006.01)
C08F 222/10 (2006.01)
C08L 35/00 (2006.01)
C08J 3/05 (2006.01)
C05G 3/80 (2020.01)
C05G 3/90 (2020.01)
C05G 5/20 (2020.01)

(52) U.S. Cl.
CPC .............. C05G 3/44 (2020.02); C05C 9/00 (2013.01); C05C 9/005 (2013.01); C05D 9/02 (2013.01); C05G 3/80 (2020.02); C05G 3/90 (2020.02); C05G 5/20 (2020.02); C08F 222/10 (2013.01); C08F 230/06 (2013.01); C08J 3/05 (2013.01); C08K 3/38 (2013.01); C08L 35/00 (2013.01); C08J 2333/02 (2013.01); C08L 2201/54 (2013.01); Y02P 60/218 (2015.11)

(58) Field of Classification Search
CPC ...... C05G 3/0082; C05G 3/0064; C05G 3/08; C05G 3/04; C05C 9/00; C05C 9/005; C08J 3/05; C08J 2333/02; C08L 35/00; C08L 2201/54; C08F 230/06; C08F 222/10; C05D 9/02; C08K 3/38; Y02P 60/218
See application file for complete search history.

(56) References Cited

U.S. PATENT DOCUMENTS

| 2,618,547 A | 1/1950 | Davenport et al. |
| 2,616,849 A | 11/1952 | Giammaria |
| 2,616,853 A | 11/1952 | Giammaria |
| 2,625,471 A | 1/1953 | Mowry et al. |
| 2,625,529 A | 1/1953 | Hedrick et al. |
| 2,976,138 A | 3/1961 | Hester |
| 3,052,648 A | 9/1962 | Bauer |
| 3,087,893 A | 4/1963 | Agius et al. |
| 3,130,033 A | 4/1964 | Stephens |
| 3,222,282 A | 12/1965 | Berkowitz et al. |
| 3,262,919 A | 7/1966 | Bolgiono |
| 3,308,067 A | 3/1967 | Diehl |
| 3,497,334 A | 2/1970 | Gee et al. |
| 3,634,052 A | 1/1972 | Gee et al. |
| 3,639,242 A | 2/1972 | Le Suer |
| 3,685,998 A | 8/1972 | Miller |
| 3,720,765 A | 3/1973 | Miller |
| 3,796,559 A | 3/1974 | Windgassen |
| 3,873,487 A | 3/1975 | Minato et al. |
| 3,936,427 A | 2/1976 | Viout et al. |
| 3,953,191 A | 4/1976 | Barton |
| 3,996,134 A | 12/1976 | Osborn et al. |
| 3,997,319 A | 12/1976 | Ott |
| 4,007,029 A | 2/1977 | Kenton |

(Continued)

FOREIGN PATENT DOCUMENTS

| CN | 1044025 A | 7/1990 |
| CN | 1149239 A | 5/1997 |

(Continued)

OTHER PUBLICATIONS

Sciarra, John J., and Donald Elliott. "A Solubility Study of the Boric Acid-Glycerin Complex I: Solubility of Boric Acid in Glycerin Solution at 25°." Journal of the American Pharmaceutical Association (Scientific ed.) 49.2 (1960): 115-117.*

(Continued)

Primary Examiner — Jennifer A Smith
(74) Attorney, Agent, or Firm — Katten Munchin Rosenman LLP

(57) ABSTRACT

Aqueous liquid formulations contain one or more anionic polymers, a high concentration of boron compounds, and a boron dispersant or solvent. The compositions are operable to maintain the boron content thereof in stable dispersion for at least 72 hours. The dispersant or solvent is selected from saturated aliphatic diols, glycols, hydroxyl-rich compounds, alpha-hydroxy acids, and mixtures thereof. Preferred polymers include dicarboxylic repeat units and optional sulfonate repeat units. The formulations have heretofore unattainable high boron contents, and are useful in agricultural contexts.

40 Claims, No Drawings

(56) References Cited

U.S. PATENT DOCUMENTS

| | | | |
|---|---|---|---|
| 4,010,006 A | 3/1977 | Price | |
| 4,071,400 A | 1/1978 | Jankowiak | |
| 4,076,663 A | 2/1978 | Masuda et al. | |
| 4,082,533 A | 4/1978 | Wittenbrook et al. | |
| 4,083,835 A | 4/1978 | Pohlemann et al. | |
| 4,135,887 A | 1/1979 | Rossi | |
| 4,161,539 A | 7/1979 | Stallcup | |
| 4,165,743 A | 8/1979 | Denning | |
| 4,173,669 A | 11/1979 | Ashida et al. | |
| 4,211,765 A | 7/1980 | Johnson et al. | |
| 4,251,255 A | 2/1981 | Wagner et al. | |
| 4,434,231 A | 2/1984 | Jung | |
| 4,439,488 A | 3/1984 | Trimnell et al. | |
| 4,451,628 A | 5/1984 | Dammann | |
| 4,471,100 A | 9/1984 | Tsubakimoto et al. | |
| 4,538,532 A | 9/1985 | Coker | |
| 4,572,733 A * | 2/1986 | Howard | C05D 9/02 47/48.5 |
| 4,652,273 A | 3/1987 | Maldonado et al. | |
| 4,663,408 A | 5/1987 | Schulz et al. | |
| 4,701,204 A | 10/1987 | Duvdevani et al. | |
| 4,709,091 A | 11/1987 | Fukumoto et al. | |
| 4,725,655 A | 2/1988 | Denzinger et al. | |
| 4,808,215 A | 2/1989 | Gill et al. | |
| 4,844,725 A | 7/1989 | Malouf et al. | |
| 4,872,412 A | 10/1989 | Zollinger | |
| 4,897,220 A | 1/1990 | Trieselt et al. | |
| 4,923,500 A | 5/1990 | Sylling | |
| 4,929,690 A | 5/1990 | Goertz et al. | |
| 4,933,098 A | 6/1990 | Gutierrez et al. | |
| 4,936,897 A | 6/1990 | Pipko et al. | |
| 4,952,415 A | 8/1990 | Winowiski et al. | |
| 5,013,769 A | 5/1991 | Murray et al. | |
| 5,024,676 A | 6/1991 | Moriyama et al. | |
| 5,035,821 A | 7/1991 | Chung et al. | |
| 5,047,078 A | 9/1991 | Gill | |
| 5,054,434 A | 10/1991 | Wax et al. | |
| 5,064,563 A | 11/1991 | Yamaguchi et al. | |
| 5,106,648 A | 4/1992 | Williams | |
| 5,113,619 A | 5/1992 | Leps et al. | |
| 5,135,677 A | 8/1992 | Yamaguchi et al. | |
| 5,188,654 A | 2/1993 | Manalastas et al. | |
| 5,194,263 A | 3/1993 | Chamberlain et al. | |
| 5,210,163 A | 5/1993 | Grey | |
| 5,223,592 A | 6/1993 | Hughes et al. | |
| 5,256,181 A | 10/1993 | Manalastas et al. | |
| 5,294,651 A | 3/1994 | Stephens | |
| 5,300,127 A | 4/1994 | Williams | |
| 5,328,624 A | 7/1994 | Chung | |
| 5,336,727 A | 8/1994 | Okazawa et al. | |
| 5,391,632 A | 2/1995 | Krull et al. | |
| 5,399,639 A | 3/1995 | Kimpton et al. | |
| 5,427,785 A | 6/1995 | Ronson et al. | |
| 5,435,821 A | 7/1995 | Duvdevani et al. | |
| 5,536,311 A | 7/1996 | Rodrigues | |
| 5,562,916 A | 10/1996 | Van Ooijen | |
| 5,574,004 A | 11/1996 | Carr | |
| 5,578,486 A | 11/1996 | Zhang | |
| 5,597,400 A | 1/1997 | Nonomura et al. | |
| 5,653,782 A | 8/1997 | Stern et al. | |
| 5,666,905 A | 9/1997 | Mackin et al. | |
| 5,681,678 A | 10/1997 | Nealey et al. | |
| 5,688,907 A | 11/1997 | Wood et al. | |
| 5,697,186 A | 12/1997 | Neyra et al. | |
| 5,732,658 A | 3/1998 | Wolters et al. | |
| 5,741,521 A | 4/1998 | Knight et al. | |
| 5,760,150 A | 6/1998 | Bachus | |
| 5,788,722 A | 8/1998 | Emert et al. | |
| 5,916,029 A | 6/1999 | Smith et al. | |
| 5,993,666 A | 11/1999 | Yamaguchi et al. | |
| 5,994,265 A | 11/1999 | Barclay et al. | |
| 5,997,602 A | 12/1999 | Aijala | |
| 6,022,555 A | 2/2000 | DeLuca et al. | |
| 6,057,398 A | 5/2000 | Blum | |
| 6,100,221 A | 8/2000 | Poelker et al. | |
| 6,100,224 A | 8/2000 | Peiffer et al. | |
| 6,139,596 A | 10/2000 | Barth et al. | |
| 6,180,589 B1 | 1/2001 | Rodrigues et al. | |
| 6,187,074 B1 | 2/2001 | von Locquenghien et al. | |
| 6,199,318 B1 | 3/2001 | Stewart et al. | |
| 6,207,780 B1 | 3/2001 | Stockhausen et al. | |
| 6,221,956 B1 | 4/2001 | Chen | |
| 6,228,806 B1 | 5/2001 | Mehta | |
| 6,271,191 B1 | 8/2001 | Kerobo et al. | |
| 6,287,359 B1 | 9/2001 | Erhardt et al. | |
| 6,309,439 B1 | 10/2001 | von Locquenghien et al. | |
| 6,312,493 B1 | 11/2001 | Eltink et al. | |
| 6,384,166 B1 | 5/2002 | Austin et al. | |
| 6,395,051 B1 | 5/2002 | Arnold et al. | |
| 6,413,292 B1 | 7/2002 | von Locquengh et al. | |
| 6,444,771 B1 | 9/2002 | Yamaguchi et al. | |
| 6,471,741 B1 | 10/2002 | Reinbergen | |
| 6,488,734 B1 | 12/2002 | Barth et al. | |
| 6,500,223 B1 | 12/2002 | Sakai et al. | |
| 6,515,090 B1 | 2/2003 | Sanders et al. | |
| 6,515,091 B2 | 2/2003 | Sanders et al. | |
| 6,544,313 B2 | 4/2003 | Peacock et al. | |
| 6,569,976 B2 | 5/2003 | Baxter et al. | |
| 6,586,560 B1 | 7/2003 | Chen et al. | |
| 6,632,262 B2 | 10/2003 | Gabrielson | |
| 6,635,702 B1 | 10/2003 | Schmucker-Castner et al. | |
| 6,653,428 B1 | 11/2003 | Klein et al. | |
| 6,703,469 B2 | 3/2004 | Sanders et al. | |
| 6,734,148 B2 | 5/2004 | Bell et al. | |
| 6,770,616 B1 | 8/2004 | McGowan et al. | |
| 6,830,603 B2 * | 12/2004 | Whitehurst | C05C 9/00 71/28 |
| 6,843,846 B2 | 1/2005 | Chatterji et al. | |
| 6,844,293 B1 | 1/2005 | Kirby et al. | |
| 6,855,182 B2 | 2/2005 | Sears | |
| 6,897,184 B2 | 5/2005 | Kurita et al. | |
| 6,897,253 B2 | 5/2005 | Schmucker-Castner et al. | |
| 6,930,139 B2 | 8/2005 | Sanders et al. | |
| 6,936,598 B2 | 8/2005 | Khoo et al. | |
| 7,004,991 B2 | 2/2006 | Narayanan et al. | |
| 7,019,046 B2 | 3/2006 | Narayanan et al. | |
| 7,071,259 B2 | 7/2006 | Botros | |
| 7,071,275 B2 | 7/2006 | Rath et al. | |
| 7,201,959 B2 | 4/2007 | Judek et al. | |
| 7,217,752 B2 | 5/2007 | Schmucker-Castner et al. | |
| 7,317,062 B2 | 1/2008 | Pritschins et al. | |
| 7,470,304 B2 | 12/2008 | Keenan et al. | |
| 7,537,705 B2 | 5/2009 | Mizuno et al. | |
| 7,572,328 B2 | 8/2009 | Lettkeman et al. | |
| 7,615,521 B2 | 11/2009 | Eveland et al. | |
| 7,655,597 B1 | 2/2010 | Sanders | |
| 7,666,241 B2 | 2/2010 | Sanders et al. | |
| 7,686,863 B1 | 3/2010 | Sanders | |
| 7,695,541 B1 | 4/2010 | Frizzell et al. | |
| 7,923,479 B2 | 4/2011 | Champ et al. | |
| 7,942,941 B2 | 5/2011 | Cravey et al. | |
| 8,025,709 B2 | 9/2011 | Sanders et al. | |
| 8,043,995 B2 | 10/2011 | Sanders et al. | |
| 8,097,076 B2 | 1/2012 | Göbelt et al. | |
| 8,110,017 B2 | 2/2012 | Wells | |
| 8,143,333 B2 | 3/2012 | Peppmoller et al. | |
| 8,163,859 B2 | 4/2012 | Jeon et al. | |
| 8,182,593 B2 | 5/2012 | Rapp | |
| 8,192,520 B2 | 6/2012 | Sanders | |
| 8,420,758 B2 | 4/2013 | Durant et al. | |
| 8,430,943 B2 | 4/2013 | Sanders | |
| 8,436,072 B2 | 5/2013 | Herth et al. | |
| 8,491,693 B2 | 7/2013 | Burnham | |
| 8,562,710 B2 | 10/2013 | Palmer et al. | |
| 8,592,343 B2 | 11/2013 | Xavier et al. | |
| 8,846,817 B2 | 9/2014 | Yontz et al. | |
| 9,139,481 B2 | 9/2015 | Sanders | |
| 9,145,340 B2 | 9/2015 | Sanders | |
| 2001/0002390 A1 | 5/2001 | Rodrigues | |
| 2001/0029762 A1 | 10/2001 | Steele et al. | |
| 2002/0010296 A1 | 1/2002 | Baxter et al. | |
| 2002/0049139 A1 | 4/2002 | Smale | |
| 2002/0132886 A1 | 9/2002 | Meffert et al. | |
| 2002/0132949 A1 | 9/2002 | Sanders et al. | |

(56) References Cited

U.S. PATENT DOCUMENTS

| | | |
|---|---|---|
| 2003/0203825 A1 | 10/2003 | Aubay |
| 2003/0225233 A1 | 12/2003 | Dilocker et al. |
| 2004/0202634 A1 | 10/2004 | L'Alloret |
| 2004/0211234 A1 | 10/2004 | Volgas et al. |
| 2004/0226329 A1 | 11/2004 | Sanders et al. |
| 2004/0226330 A1 | 11/2004 | Sanders et al. |
| 2004/0226331 A1 | 11/2004 | Sanders et al. |
| 2004/0230020 A1 | 11/2004 | Sanders et al. |
| 2004/0265266 A1 | 12/2004 | Champ et al. |
| 2004/0266621 A1 | 12/2004 | West |
| 2005/0050931 A1 | 3/2005 | Sanders et al. |
| 2005/0090402 A1 | 4/2005 | Dieing et al. |
| 2005/0158268 A1 | 7/2005 | Schmucker-Castner et al. |
| 2006/0030486 A1 | 2/2006 | Meyer et al. |
| 2006/0069004 A1 | 3/2006 | Song et al. |
| 2006/0078526 A1 | 4/2006 | Boyd et al. |
| 2006/0147623 A1 | 7/2006 | Sanders et al. |
| 2006/0191851 A1 | 8/2006 | Mizuno et al. |
| 2006/0234901 A1 | 10/2006 | Scheuing et al. |
| 2007/0027281 A1 | 2/2007 | Michl et al. |
| 2007/0161524 A1 | 7/2007 | Counradi et al. |
| 2007/0212320 A1 | 9/2007 | Demitz et al. |
| 2007/0213243 A1 | 9/2007 | Yao et al. |
| 2007/0218168 A1 | 9/2007 | Hale, III |
| 2008/0044548 A1 | 2/2008 | Hale, III |
| 2008/0189085 A1 | 8/2008 | Cook et al. |
| 2009/0071213 A1 | 3/2009 | Keenan et al. |
| 2009/0149364 A1 | 6/2009 | Beck |
| 2009/0151755 A1 | 6/2009 | Beck |
| 2009/0163365 A1 | 6/2009 | Bentlage et al. |
| 2009/0227451 A1 | 9/2009 | Rose et al. |
| 2009/0258786 A1 | 10/2009 | Pursell et al. |
| 2009/0270257 A1 | 10/2009 | Pursell et al. |
| 2009/0308122 A1 | 12/2009 | Shah |
| 2010/0012040 A1 | 1/2010 | Pow et al. |
| 2010/0024500 A1 | 2/2010 | Tyler |
| 2010/0099566 A1 | 4/2010 | Bobnock |
| 2010/0120617 A1 | 5/2010 | Dyllick-Brenzinger et al. |
| 2010/0122379 A1 | 5/2010 | Dieckmann et al. |
| 2010/0167975 A1 | 7/2010 | Vandermeulen et al. |
| 2010/0175443 A1 | 7/2010 | Sanders et al. |
| 2010/0203228 A1 | 8/2010 | Funaki et al. |
| 2010/0210802 A1 | 8/2010 | Creamer et al. |
| 2010/0234233 A1 | 9/2010 | Sannino et al. |
| 2010/0234506 A1 | 9/2010 | Elizalde et al. |
| 2010/0298526 A1 | 11/2010 | Tsumori et al. |
| 2011/0042318 A1 | 2/2011 | Painter et al. |
| 2011/0095227 A1 | 4/2011 | Herth et al. |
| 2011/0146136 A1 | 6/2011 | Waterson et al. |
| 2011/0303157 A1 | 12/2011 | Laubenstein |
| 2012/0004383 A1 | 1/2012 | Laubender et al. |
| 2012/0055414 A1 | 3/2012 | Correa |
| 2012/0065071 A1 | 3/2012 | Li et al. |
| 2012/0118575 A1 | 5/2012 | Griffin |
| 2012/0129749 A1 | 5/2012 | Detering et al. |
| 2012/0129750 A1 | 5/2012 | Detering et al. |
| 2012/0220454 A1 | 8/2012 | Chen et al. |
| 2012/0277099 A1 | 11/2012 | Olson et al. |
| 2012/0277133 A1 | 11/2012 | DiBiase et al. |
| 2013/0090240 A1 | 4/2013 | Yamaguchi et al. |
| 2013/0171737 A1 | 7/2013 | Way et al. |
| 2013/0212739 A1 | 8/2013 | Giritch et al. |
| 2014/0106023 A1 | 4/2014 | Sanders |
| 2014/0106024 A1 | 4/2014 | Sanders |
| 2014/0315716 A1 | 10/2014 | Matheny et al. |
| 2014/0342905 A1 | 11/2014 | Bullis et al. |
| 2015/0033811 A1 | 2/2015 | Sanders |
| 2016/0174547 A1 | 6/2016 | Sanders et al. |
| 2016/0174549 A1 | 6/2016 | Sanders et al. |
| 2016/0175469 A1 | 6/2016 | Sanders et al. |
| 2016/0177004 A1 | 6/2016 | Sanders et al. |
| 2016/0185678 A1 | 6/2016 | Sanders et al. |
| 2016/0272553 A1 | 9/2016 | Sanders et al. |

FOREIGN PATENT DOCUMENTS

| | | |
|---|---|---|
| CN | 1962565 A | 5/2007 |
| CN | 101423431 A | 5/2009 |
| CN | 101519324 A | 9/2009 |
| CN | 101575243 A | 11/2009 |
| CN | 101580409 | 11/2009 |
| CN | 101792348 A | 8/2010 |
| CN | 101830571 A | 9/2010 |
| CN | 101885798 A | 11/2010 |
| CN | 101885888 A | 11/2010 |
| CN | 102154013 A | 8/2011 |
| DE | 2558551 A1 | 7/1977 |
| DE | 2822488 A1 | 11/1979 |
| DE | 4122490 A1 | 1/1993 |
| DE | 4132620 A1 | 4/1993 |
| EP | 0290807 A2 | 11/1988 |
| EP | 0314070 A2 | 5/1989 |
| EP | 0337694 A2 | 10/1989 |
| EP | 0683985 A1 | 11/1995 |
| EP | 0877076 A2 | 11/1998 |
| EP | 0892111 A1 | 1/1999 |
| EP | 0976699 A1 | 2/2000 |
| EP | 1024692 A1 | 8/2000 |
| EP | 1024692 A1 | 9/2000 |
| EP | 1230195 A1 | 8/2002 |
| EP | 2135854 A2 | 12/2009 |
| GB | 1324087 | 7/1973 |
| JP | 54050027 A | 4/1979 |
| JP | 54077294 A | 6/1979 |
| JP | S58131903 A | 8/1983 |
| JP | 60101194 A | 5/1985 |
| JP | 62096046 A | 5/1986 |
| JP | 61282301 A | 12/1986 |
| JP | 63083169 A | 4/1988 |
| JP | 63148937 A | 6/1988 |
| JP | 03112426 | 5/1991 |
| JP | H07215746 A | 8/1995 |
| JP | 08092591 A | 4/1996 |
| JP | 11092788 A | 4/1999 |
| JP | 2008023433 A | 2/2008 |
| RU | 2051884 C1 | 1/1996 |
| RU | 2378869 C1 | 1/2010 |
| WO | 9715367 A1 | 5/1997 |
| WO | 9918785 A1 | 4/1999 |
| WO | 9948833 A1 | 9/1999 |
| WO | 2006131213 A1 | 12/2006 |
| WO | 2007003388 A2 | 1/2007 |
| WO | 2009060012 A2 | 5/2009 |
| WO | 2009061930 A1 | 5/2009 |
| WO | 2015031521 A1 | 3/2015 |
| WO | 2015035031 A1 | 3/2015 |
| WO | 2015116716 A1 | 8/2015 |
| WO | 2015179552 A1 | 11/2015 |
| WO | 2015179687 A1 | 11/2015 |

OTHER PUBLICATIONS

Agrotain International LLC White Paper: Maleic-Itaconic Copolymer; available online at talk.newagtalk.com/forums/get-attachment.asp?attachmentid=42697; downloaded Feb. 1, 2017.

Avail MSDS dated Jan. 16, 2012.

Aziz, et al. *Efficiency of Slow Release Urea Fertilizer on Herb Yield and Essential Oil Production of Lemon Balm (Melissa officinalis L.) Plant*. American-Eurasian J. Agric. & Environ. Sci., [Online] 5(2) :141-147, 2009.

Blair. Sulphur Enhanced Fertilizer (SEF). A new generation of fertilizers. The Proceedings of the International Plant Nutrition Colloquium XVI, Department of Plant Sciences, UC Davis, [Online] 2009.

Chen, et al. *Effect of a Polymer on Mitigating Ammonia Emission from Liquid Dairy Manure*. Efekat polimera na smanjenje emisije /Polj. tehn. (Jan. 2013), 1-13.

Chiba, Lee I. *Animal Nutrition Handbook, Section 12: Poultry Nutrition and Feeding*. pp. 316-331, 2009—available online at http://www.ag.auburn.edu/%7Echibale/an12poultryfeeding.pdf.

(56) References Cited

OTHER PUBLICATIONS

Chien et al. *Review of Maleic-Itaconic Acid Copolymer Purported as Urease Inhibitor and Phosphorus Enhancer in Soils.*. Agronomy Journal 106(2) : 423-430, 2014.
CN Search Report in Application No. 201080047969.4 received with First Office Action dated Jul. 31, 2013.
Davidson et al. *Persistence of Rhizobium japonicum on the Soybean Seed Coat Under Controlled Temperature and Humidity*. Applied and Environmental Microbiology, 35 : 94-96, 1978.
EP Search Report 1 dated Jun. 16, 2016 in related Application No. 13847267.5.
EP Search Report 2 dated Jun. 10, 2016 in related Application No. 16161777.4.
EP Search Report 3 dated Jun. 13, 2016 in related Application No. 16161780.8.
EP Search Report 4 dated Jul. 26, 2016 in related Application No. 16161783.2.
EP Search Report 5 dated Jun. 13, 2016 in related Application No. 16161786.5.
EP Search Report 6 dated Jun. 20, 2016 in related Application No. 16161785.7.
Gay, et al. *Ammonia Emissions and Animal Agriculture*. Virginia Cooperative Extension, Publication 442-110, Virginia Polytechnic Institute and State University, 2009.
*Grains/Fertilizers*, article found online at martinsachs.angelfire.com/feeding.html, dated Apr. 11, 2010.
Groenstein, C.M. et al. *Measures to Reduce Ammonia Emissions from Livestock Manures; Now, Soon, Later*. Wageningen UK Livestock Research; Report 488; Jun. 2011.
Herrington et al. *Rheological modification of bitumen with maleic anhydride and dicarboxylic acids*. Fuel, 78 : 101-110, 1999.
International Preliminary Report on Patentability 1 in corresponding application PCT/US2014/052987, dated Mar. 10, 2016.
International Preliminary Report on Patentability 2 in related application PCT/US 2014/054069, dated Dec. 11, 2014.
International Search Report and Written Opinion 1 in related application PCT/US 2010/050244, dated Jun. 27, 2011.
International Search Report and Written Opinion 2 in related application PCT/US 2013/064378, dated Jan. 23, 2014 (Note: for cited reference RU2375063, see U.S. Pat. No. 6,936,598).
International Search Report and Written Opinion 3 in related application PCT/US 2013/054373, dated Dec. 12, 2013.
International Search Report and Written Opinion 4 in corresponding application PCT/US 2014/052987, dated Jan. 16, 2015.
International Search Report and Written Opinion 5 in related application PCT/US 2014/054069, dated Dec. 11, 2014.
International Search Report and Written Opinion 6 in related application PCT/US 2014/049451, dated Dec. 18, 2014.
International Search Report and Written Opinion 7 in related application PCT/US 2014/039424, dated Oct. 16, 2014.
International Search Report and Written Opinion 8 in related application PCT/US 2015/013345, dated Apr. 13, 2015.
International Search Report and Written Opinion 9 in related application PCT/US 2015/032037, dated Aug. 28, 2015.
International Search Report and Written Opinion 10 in related application PCT/US 2015/031823, dated Aug. 28, 2015.
Jung et al. *Polymer-entrapped rhizobium as an inoculants for legumes*. Plant and Soil, 65 : 219-231, 1982.
Kahraman et al. *Bioengineering Polyfunctional Copolymers. VII. Synthesis and characterization of copolymers of p-vinylphenyl boronic acid with maleic and citraconic anhydrides and their self-assembled macrobranched supramolecular architectures*. Polymer 45 :5813-5828, 2004.

Kejun et al., *Copolymerization of cis-Butenedioic Acid with Sodium Methallylsulfonate in Aqueous Solution*. J. App. Poly. Sci., vol. 40 : 1529-1539; 1990.
Li et al. *Dispersion and Rheological Properties of Concentrated Kaolin Suspensions with Polycarboxylate Copolymers Bering Comblike Side Chains*. Journal of the European Ceramic Society, 34(1) :137-146, Jan. 2014.
Machida et al. *Water Soluble Polymers. Ix. N-(2-chloroethyl)-sulfonamides of Styrene-maleic Acid and Styrene-itaconic Acid Copolymers*. Sen'i Gakkaishi 22(6) :269-73,1996.
Mohan, Prasanthrajan et al. *Addressing the Challenges of Ammonia Loss from Poultry Droppings through Indigenous Carbon Wastes*. International Journal of Environmental Science and Development, 3 (4), Aug. 2012—available online at http://www.ijesd.org/papers/255-D590.pdf.
Naga et al. *Polymeric Additives for Pour Point Depression of Residual Fuel Oils*. J. Chem. Tech. Biotechnol. 35A : 241-247, 1985.
Patterson, Paul H. *Hen House Ammonia: Environmental Consequences and Dietary Strategies*. Multi-State Poultry Meeting, May 14-16, 2002—available online at http://www.ijesd.org/papers/255-D590.pdf.
Powers, Wendy. *Practices to Reduce Ammonia*. 2004—available online at http://www.thepoultrysite.com/articles/219/practices-to-reduce-ammonia.
Prochnow, L.I. et al. *Controlling Ammonia Losses During Manure Composting with the Addition of Phosphogypsum and Simple Superphosphate*. Sci.Agri., Piracicaba, 52(2) :346-349, mai/ago 1995.
Puoci et al. *Polymer in Agriculture: a Review*. American Journal of Agricultural and Biological Sciences, 3 :299-314, 2008.
Sanderson, et al. *Effect of Gypsum and Elemental Sulphur on Calcium and Sulphur Content of Rutabagas in Podzolic Soils*. Can J Plan Sci [Online], pp. 785-788, 2002.
Shakkthivel et al. *Newly Developed Itaconic Acid Copolymers for Gypsum and Calcium Carbonate Scale Control*. Journal of Applied Polymer Science, 103(5) :3206-3213, 2007.
Singh, A. et al. *Efficacy of Urease Inhibitor to Reduce Ammonia Emission from Poultry Houses*. J. Appl. Poult. Res., 18 :34-42, 2009—available online at http://japr.fass.org/content/18/1/34.full.
*Sodium Lignosulphonate*. Available online at www.xyd-chem.com on Apr. 20, 2010.
US Provisional Patent Application entitled Polyanionic Polymers, U.S. Appl. No. 62/001,110, filed May 21, 2014.
Weir, B.S. The current taxonomy of rhizobia. NZ Rhizobia website. http://www.rhizobia.co.nz/taxonomy/rhizobia; Partial update: May 2, 2013.
Yang, Charles Q. et al. *In-situ Polymerization of Maleic Acid and Itaconic Acid and Crosslinking of Cotton Fabric*. Textile Research Journal, 69(10) :782-789, 1999.
Yang, Charles Q. et al. *In-situ Polymerization of Maleic Acid and Itaconic Acid on Cotton: MALDI/TOF Mass Spectroscopy and Light-Scattering Study*. Textile Research Journal, 70(4) :359-62, 2000.
Yanhe et al. *Synthesis and Performance of Itaconic Acid-Maleic Acid Copolymer*. .Indus. Wat. Treat. 2006 10, pagination unknown. DOI: cnki:ISSN:1005-829X.0.2006-10-017.
Yasmin, et al. *Effect of Elemental Sulfur, Gypsum, and Elemental Sulfur Coated Fertilizers on the Availability of Sulfur to Rice*. J Plant Nutr [Online], 20(1): 79-91, 2007.
Zhang et al. *Synthesis and Inhibition Efficiency of a Novel Quadripolymer Inhibitor*. Chin. J. Ch. E. 15(4) :600; 2007.

\* cited by examiner

POLYMER-BORIC ACID COMPOSITIONS

CROSS-REFERENCE TO RELATED APPLICATIONS

This is a continuation of International Application No. PCT/US2014/054069, filed Sep. 4, 2014, claiming the benefit of two (2) U.S. provisional application Ser. No. 61/874,025, filed Sep. 5, 2013, and Ser. No. 62/001,330, filed May 21, 2014. The PCT and provisional applications are all incorporated herein by reference in their entireties.

BACKGROUND OF THE INVENTION

Field of the Invention

The present invention is broadly concerned with aqueous liquid compositions containing anionic polymer(s), boron compound(s), and boron compound dispersant(s) or solvent(s), having relatively high, heretofore unattainable contents of non-precipitating boron compound(s). More particularly, the invention is concerned with such compositions preferably having one or more polymers including relatively high fractions of dicarboxyl repeat units, boric acid, and polyol or alpha-hydroxy acid dispersants or solvents, which find particular utility in agricultural contexts.

Description of the Prior Art

For a number of years, Specialty Fertilizer Products, LLC of Leawood, Kans., has commercialized a series of aqueous dispersions of maleic-itaconic copolymers in partial salt form. These products include AVAIL® for use with granular and liquid fertilizers (respectively the partial sodium and ammonium salts), and NUTRISPHERE-N® for use with granular and liquid fertilizers (the partial calcium salt). For example, such products may be sprayed or otherwise applied to the surface of solid fertilizers, such as urea, ammonium salts, monoammonium phosphate (MAP), diammonium phosphate (DAP), and gypsum, or mixed with liquid fertilizers, such as UAN and ammonium polyphosphate.

These prior products have been shown to have a number of outstanding agricultural properties, including the ability to enhance the uptake of fertilizer nutrients (e.g., phosphates, nitrogen, potassium, and micronutrients), to act as adjuvants for pesticides such as glyphosate herbicides, and, when supplemented with an organic drying agent, to very quickly dry when applied to solid fertilizers, thereby facilitating production of final coated solid fertilizer products. Moreover, the preferred copolymers have been shown to have enhanced activity when fertilizer formulations containing both the calcium and sodium copolymer partial salts are employed (U.S. Patent Publication No. 2009-0217723). This technology is also described in U.S. Pat. Nos. 6,515,090, 7,655,597, 7,736,412, and 8,043,995, and related patents.

It is also known that boron compounds, and especially boric acid, can be added to the maleic-itaconic copolymers described above to obtain beneficial agricultural results when mixed with or applied to solid nitrogenous fertilizers, such as granular urea, and liquid fertilizers, such as UAN. Specifically, the presence of boron compounds provides enhanced performance, especially in the prevention of loss of nitrogen from such nitrogen-containing fertilizers. U.S. Pat. No. 8,025,709 teaches that boric acid at a level of from about 0.5-5% can be used to supplement the maleic-itaconic copolymers, particularly when used with bimodal polyvinyl alcohols.

However, it has been found that the use of boron compounds such as boric acid is limited in that these compounds are difficult to maintain in dispersion or solution with desirable polyanionic polymers. Hence, while the advantages of relatively high boron compound loadings with polyanionic polymers are well known, there has heretofore been no way to maintain these compounds in effective dispersion or solution, particularly during long-term storage or under adverse (especially cold) storage conditions.

Boric acid solubility has been enhanced by the use of alcohols, usually methanol, in certain compositions. However, alcohols present problems associated with handling, toxicity, and flammability, and furthermore do not increase boric acid solubility to desirable levels.

Accordingly, there is a need in the art for improved aqueous anionic polymer compositions containing boron compounds, such as boric acid, at high levels, and without the use of methanol, and which maintain the boron compounds in effective dispersion or solution over relatively long storage times and adverse storage conditions.

SUMMARY OF THE INVENTION

The present invention overcomes the problems outlined above, and provides improved aqueous polymeric liquid compositions which are especially designed for use with solid or liquid fertilizers in order to enhance plant uptake of fertilizer nutrients and/or to minimize the loss of nitrogen from nitrogenous fertilizers. Generally speaking, the liquid compositions of the invention comprise a quantity of a polyanionic polymer, a quantity of a boron compound, and a quantity of a boron compound dispersant or solvent which is compatible with the particular fertilizers to be treated with the liquid compositions, and selected from the group consisting of: (1) saturated aliphatic diols, glycols, and mixtures thereof which are essentially free of carbon-carbon double bonds; (2) saturated compounds having three or more hydroxyl groups and which are essentially free of carbon-carbon double bonds; (3) aliphatic alpha-hydroxy acids essentially free of carbon-carbon double bonds and ring structures; (4) saturated compounds having three or more hydroxyl groups which are essentially free of carbon-carbon double bonds and have a carbon atom/hydroxyl group mole ratio of from about 1.8:1-2.5:1; and (5) mixtures of the foregoing. The polyanionic polymer, boron compound, and boron compound dispersant or solvent, are in aqueous dispersion or solution, and are operable to maintain the boron compound content thereof in quiescent stable dispersion or solution for a period of at least about 72 hours, more preferably at least about 30 days, at ambient temperature without stirring or mixing.

As used herein, "compatible with the particular fertilizers to be treated with the liquid compositions" refers to the fact that certain of the defined boron compound dispersants or solids, and especially the alpha-hydroxy acids, may react with and adversely affect some solid (e.g., granular) fertilizers. For example, use of alpha-hydroxy acid boron solvents or dispersants as a part of compositions to be applied to granular nitrogen-containing fertilizers may degrade the fertilizers. This problem can be avoided by minimizing the use of such alpha-hydroxy acid components to levels which will not adversely affect the fertilizer, or by eliminating their use altogether, and instead employing the other types of boron compound solvents or dispersants set forth above. Stated otherwise, "compatible" compositions in accordance with the invention will not materially degrade or adversely react with the particular fertilizer in question, to the point that the fertilizer/composition product is not useful for its intended purpose.

The anionic polymer may include one or a number of different polymers, but preferably contain at least about 10%, more preferably at least about 25%, anionic groups by mole fraction, which are capable of reacting with multivalent metal cations. Advantageously, the anionic groups are predominantly carboxylic groups, and are present through use of dicarboxylic repeat units in the polymers. Thus, a wide variety of anionic polymers can be used, but it has been found that three particular classes of polymers, Classes I, IA, and II defined herein, are especially useful.

The boron compounds include boric acid in all forms thereof, as well as borates and polyborates which are generally the salts of oxyacids of boron. One or a plurality of boron compounds may be used in the compositions.

The preferred boron compound dispersants or solvents are selected from the group consisting of propanediols, butanediols, glycols, C2-C10 compounds having three or more hydroxyl groups, lactic acid, glycolic acid, and saturated compounds having three or more hydroxyl groups which are essentially free of carbon-carbon double bonds and have a carbon atom/hydroxyl group mole ratio of from about 1.8:1-2.5:1, and mixtures thereof. As used herein, "dispersion" or "dispersant" is intended to embrace all types of aqueous systems where solids or liquids are mixed with water, such as suspensions, colloids, sols, solutions, and emulsions.

The compositions preferably include water, anionic polymer(s) at a level of from about 15-60% by weight, more preferably from about 25-45% by weight; boron compound (s) at a level of from about 2.5-7.5% by weight, more preferably from about 3-5% by weight, and most preferably about 3-4% by weight; and boron dispersant(s) or solvent(s) at a level of from about 5-50% by weight, more preferably from about 15-40% by weight, all of the weight percentages based upon the total weight of the composition taken as 100% by weight. The compositions are generally acidic, and have a pH of up to about 7, more preferably up to about 6. Although not wishing to be bound by any theory of action or utility, it is believe that the presence of the boron compound dispersants or solvents aids in the plant uptake of boron in the soil, and largely overcomes the inherent buffering capacity of carbonates in the soil.

It will further be appreciated that other ingredients may be used with the compositions of the invention. For example, dyes of various colors may be used which may serve as useful visual indicators that given volumes of fertilizers have been treated with the compositions.

The compositions of the invention may be used by application thereof to the soil adjacent growing plants or seeds, or by foliar application directly onto growing plants.

DETAILED DESCRIPTION OF THE PREFERRED EMBODIMENTS

The compositions of the invention are aqueous mixtures comprising one or more selected polyanionic polymers, especially polycarboxylic polymers, one or more boron compounds, and one or more boron compound dispersants or solvents, all described below. The compositions of the invention are at least stable dispersions, i.e., polymer systems where individual polymers as a discontinuous phase are dispersed in a continuous aqueous phase. More preferably, the compositions of the invention are solutions where individual polymers are solvated in the liquid phase of the compositions. The compositions are also characterized by maintaining the boron compound content thereof in stable dispersion or solution over a period of at least about 72 hours at ambient temperature without stirring, and more preferably at least about 30 days. Substantial maintenance of the stable dispersion or solution refers to the fact that at least about 95% by weight, and more preferably at least about 98% by weight, of the boron compound content of the compositions stays in dispersion/solution without precipitation.

The Polyanionic Polymers

Generally speaking, the polymers of the invention should have a molecular weight of about 500-5,000,000, more preferably from about 1500-50,000, and contain at least three and preferably more repeat units per molecule (preferably from about 10-500). Moreover, the partial or complete salts of the polymers should be water dispersible and preferably water soluble, i.e., they should be dispersible or soluble in pure water to a level of at least about 5% w/w at room temperature with mild agitation.

Advantageously, at least about 50% (by mole) of repeat units contain at least 1 carboxylate group. These species also are typically capable of forming stable solutions in pure water up to at least about 20% w/w solids at room temperature.

To summarize, the preferred polymers of the invention have the following characteristics:
  The polymers should be dispersible and more preferably fully soluble in water.
  The polymers should have a significant number of anionic functional groups, preferably at least about 90 mole percent by weight, more preferably at least about 96 mole percent by weight, and most preferably the polymers are essentially free of non-anionic functional groups.
  The polymers are stable thermally and chemically for convenient use.
  The polymers should be essentially free of ester groups, i.e., no more than about mole percent thereof, and most preferably no more than about 1 mole percent.
  The polymers should have only a minimum number of amide-containing repeat units, preferably no more than about 10 mole percent thereof, and more preferably no more than about 5 mole percent.
  The polymers should have only a minimum number of monocarboxylate repeat units, preferably no more than about 10 mole percent thereof, and more preferably no more than about 5 mole percent.

The ensuing detailed description of preferred polymers makes use of the art-accepted term "repeat units" to identify the moieties in the polymers. As used herein, "repeat unit" refers to chemically converted forms (including isomers and enantiomers) of initially chemically complete monomer molecules, where such repeat units are created during polymerization reactions, with the repeat units bonding with other repeat units to form a polymer chain. Thus, a type B monomer will be converted to a type B repeat unit, and type C and type G monomers will be converted type C and G repeat units, respectively. For example, the type B maleic acid monomer will be chemically converted owing to polymerization conditions to the corresponding type B maleic acid repeat unit, as follows:

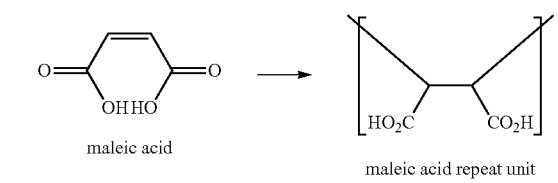

maleic acid maleic acid repeat unit

Different monomers within a given polymerization mixture are converted to corresponding repeat units, which bond to each other in various ways depending upon the nature of the repeat groups and the polymerization reaction conditions, to create the final polymer chain, apart from end groups.

In carrying out the invention, it has been determined that certain specific families or classes of polymers are particularly suitable. These are described below as "Class I," "Class IA," and "Class II" polymers. Of course, mixtures of these polymer classes are also contemplated.

Class I Polymers

The Class I polyanionic polymers of the present invention are at least tetrapolymers, i.e., they are composed of at least four different repeat units individually and independently selected from the group consisting of type B, type C, and type G repeat units, and mixtures thereof, described in detail below. However, the Class I polymers comprehend polymers having more than four distinct repeat units, with the excess repeat units being selected from the group consisting of type B, type C, and type G repeat units, and mixtures thereof, as well as other monomers or repeat units not being type B, C, or G repeat units.

Preferred Class I polymers contain at least one repeat unit from each of the B, C, and G types, one other repeat unit selected from the group consisting of type B, type C, and type G repeat units, and optionally other repeat units not selected from type B, type C, and type G repeat units. Particularly preferred polymers comprise a single type B repeat unit, a single type C repeat unit, and two different type G repeat units, or two different type B repeat units, a single type C repeat unit, and one or more different type G repeat units.

However constituted, preferred Class I polymers contain at least about 90 mole percent (more preferably at least about 96 mole percent) of repeat units selected from the group consisting of type B, C, and G repeat units (i.e., the polymers should contain no more than about 10 mole percent (preferably no more than about 4 mole percent) of repeat units not selected from types B, C, and G).

The Class I polymers are easily converted to partial or fully saturated salts by a simple reaction with an appropriate salt-forming cation compound. Usable cations can be simple cations such as sodium, but more complex cations can also be used, such as cations containing a metal atom and other atom(s) as well, e.g., vanadyl cations. Among preferred metal cations are those derived from alkali, alkaline earth, and transition metals. The cations may also be amines (as used herein, "amines" refers to primary, secondary, or tertiary amines, monoamines, diamines, and triamines, as well as ammonia, ammonium ions, quaternary amines, quaternary ammonium ions, alkanolamines (e.g., ethanolamine, diethanolamine, and triethanolamine), and tetraalkylammonium species). The most preferred class of amines are alkyl amines, where the alkyl group(s) have from 1-30 carbon atoms and are of straight or branched chain configuration. Such amines should be essentially free of aromatic rings (no more than about 5 mole percent aromatic rings, and more preferably no more than about 1 mole percent thereof). A particularly suitable alkyl amine is isopropylamine. These possible secondary cations should be reacted with no more than about 10 mole percent of the repeat units of the polymer.

1. Type B Repeat Units

Type B repeat units are dicarboxylate repeat units derived from monomers of maleic acid and/or anhydride, fumaric acid and/or anhydride, mesaconic acid and/or anhydride, substituted maleic acid and/or anhydride, substituted fumaric acid and/or anhydride, substituted mesaconic acid and/or anhydride, mixtures of the foregoing, and any isomers, esters, acid chlorides, and partial or complete salts of any of the foregoing. As used herein with respect to the type B repeat units, "substituted" species refers to alkyl substituents (preferably C1-C6 straight or branched chain alkyl groups substantially free of ring structures), and halo substituents (i.e., no more than about 5 mole percent of either ring structures or halo substituents, preferably no more than about 1 mole percent of either); the substituents are normally bound to one of the carbons of a carbon-carbon double bond of the monomer(s) employed. In preferred forms, the total amount of type B repeat units in the Class I polymers of the invention should range from about 1-70 mole percent, more preferably from about 20-65 mole percent, and most preferably from about 35-55 mole percent, where the total amount of all of the repeat units in the Class I polymer is taken as 100 mole percent.

Maleic acid, methylmaleic acid, maleic anhydride, methylmaleic anhydride, and mesaconic acid (either alone or as various mixtures) are the most preferred monomers for generation of type B repeat units. Those skilled in the art will appreciate the usefulness of in situ conversion of acid anhydrides to acids in a reaction vessel just before or even during a reaction. However, it is also understood that when corresponding esters (e.g., maleic or citraconic esters) are used as monomers during the initial polymerization, this should be followed by hydrolysis (acid or base) of pendant ester groups to generate a final carboxylated polymer substantially free of ester groups.

2. Type C Repeat Units

Type C repeat units are derived from monomers of itaconic acid and/or anhydride, substituted itaconic acid and/or anhydride, as well as isomers, esters, acid chlorides, and partial or complete salts of any of the foregoing. The type C repeat units are present in the preferred Class I polymers of the invention at a level of from about 1-80 mole percent, more preferably from about 15-75 mole percent, and most preferably from about 20-55 mole percent, where the total amount of all of the repeat units in the polymer is taken as 100 mole percent.

The itaconic acid monomer used to form type C repeat unit has one carboxyl group, which is not directly attached to the unsaturated carbon-carbon double bond used in the polymerization of the monomer. Hence, the preferred type C repeat unit has one carboxyl group directly bound to the polymer backbone, and another carboxyl group spaced by a carbon atom from the polymer backbone. The definitions and discussion relating to "substituted," "salt," and useful salt-forming cations (metals, amines, and mixtures thereof) with respect to the type C repeat units, are the same as those set forth for the type B repeat units.

Unsubstituted itaconic acid and itaconic anhydride, either alone or in various mixtures, are the most preferred monomers for generation of type C repeat units. Again, if itaconic anhydride is used as a starting monomer, it is normally useful to convert the itaconic anhydride monomer to the acid form in a reaction vessel just before or even during the polymerization reaction. Any remaining ester groups in the polymer are normally hydrolyzed, so that the final carboxylated polymer is substantially free of ester groups.

3. Type G Repeat Units

Type G repeat units are derived from substituted or unsubstituted sulfonate-bearing monomers possessing at least one carbon-carbon double bond and at least one sulfonate group, in acid, partial or complete salt, or other form, and which are substantially free of aromatic rings and amide groups (i.e., no more than about 5 mole percent of either aromatic rings or amide groups, preferably no more than about 1 mole percent of either). The type G repeat units are preferably selected from the group consisting of C1-C8 straight or branched chain alkenyl sulfonates, substituted forms thereof, and any isomers or salts of any of the foregoing; especially preferred are alkenyl sulfonates selected from the group consisting of vinyl, allyl, and methallylsulfonic acids or salts. The total amount of type G repeat units in the Class I polymers of the invention should range from about 0.1-65 mole percent, more preferably from about 1-35 mole percent, and most preferably from about 1-25 mole percent, where the total amount of all of the repeat units in the Class I polymer is taken as 100 mole percent. The definitions and discussion relating to "substituted," "salt," and useful salt-forming cations (metals, amines, and mixtures thereof) with respect to the type G repeat units, are the same as those set forth for the type B repeat units.

Vinylsulfonic acid, allylsulfonic acid, and methallylsulfonic acid, either alone or in various mixtures, are deemed to be the most preferred monomers for generation of type G repeat units. It has also been found that alkali metal salts of these acids are also highly useful as monomers. In this connection, it was unexpectedly discovered that during polymerization reactions yielding the novel polymers of the invention, the presence of mixtures of alkali metal salts of these monomers with acid forms thereof does not inhibit completion of the polymerization reaction.

Further Preferred Characteristics of the Class I Polymers

As noted previously, the total abundance of type B, C, and G repeat units in the Class I polymers of the invention is preferably at least about 90 mole percent, more preferably at least about 96 mole percent, and most preferably the polymers consist essentially of or are 100 mole percent B, C, and G-type repeat units. It will be understood that the relative amounts and identities of polymer repeat units can be varied, depending upon the specific properties desired in the resultant polymers. Moreover, it is preferred that the Class I polymers of the invention contain no more than about 10 mole percent of any of (i) non-carboxylate olefin repeat units, (ii) ether repeat units, (iii) ester repeat units, (iv) non-sulfonated monocarboxylic repeat units, and (v) amide-containing repeat units. "Non-carboxylate" and "non-sulfonated" refers to repeat units having essentially no carboxylate groups or sulfonate groups in the corresponding repeat units, namely less that about 55 by weight in the repeat units. Advantageously, the mole ratio of the type B and type C repeat units in combination to the type G repeat units (that is, the mole ratio of (B+C)/G) should be from about 0.5-20:1, more preferably from about 2:1-20:1, and still more preferably from about 2.5:1-10:1. Still further, the polymers should be essentially free (e.g., less than about 1 mole percent) of alkyloxylates or alkylene oxide (e.g., ethylene oxide)-containing repeat units, and most desirably entirely free thereof.

The preferred Class I polymers of the invention have the repeat units thereof randomly located along the polymer chain without any ordered sequence of repeat units. Thus, the polymers hereof are not, e.g., alternating with different repeat units in a defined sequence along the polymer chain.

It has also been determined that the preferred Class I polymers of the invention should have a very high percentage of the repeat units thereof bearing at least one anionic group, e.g., at least about 80 mole percent, more preferably at least about 90 mole percent, and most preferably at least about 95 mole percent. It will be appreciated that the B and C repeat units have two anionic groups per repeat unit, whereas the preferred sulfonate repeat units have one anionic group per repeat unit.

For a variety of applications, certain tetrapolymer compositions are preferred, i.e., a preferred polymer backbone composition range (by mole percent, using the parent monomer names of the corresponding repeat units) is: maleic acid 35-50%; itaconic acid 20-55%; methallylsulfonic acid 1-25%; and allylsulfonic sulfonic acid 1-20%, where the total amount of all of the repeat units in the polymer is taken as 100 mole percent. It has also been found that even small amounts of repeat units, which are neither B nor C repeat units, can significantly impact the properties of the final polymers, as compared with prior BC polymers. Thus, even 1 mole percent of each of 2 different G repeat units can result in a tetrapolymer exhibiting drastically different behaviors, as compared with BC polymers.

The molecular weight of the polymers is also highly variable, again depending principally upon the desired properties. Generally, the molecular weight distribution for polymers in accordance with the invention is conveniently measured by size exclusion chromatography. Broadly, the molecular weight of the polymers ranges from about 800-50,000, and more preferably from about 1000-5000. For some applications, it is advantageous that at least 90% of the finished polymer be at or above a molecular weight of about 1000 measured by size exclusion chromatography in 0.1 M sodium nitrate solution via refractive index detection at 35° C. using polyethylene glycol standards. Of course, other techniques for such measurement can also be employed.

Especially preferred Class I polymers are synthesized as partial sodium salts and include the following repeat units: maleic—from about 20-55 mole percent, more preferably from about 25-50 mole percent, and most preferably from about 30-45 mole percent; itaconic—from about 35-65 mole percent, more preferably from about 40-60 mole percent, and most preferably about 50 mole percent; total sulfonated—from about 2-40 mole percent, more preferably from about 3-25 mole percent, and most preferably from about 5-20 mole percent. The total sulfonated fraction is preferably made up of a combination of methallylsulfonic and allylsulfonic repeat units, namely, methallylsulfonic—from about 1-20 mole percent, more preferably from about 3-15 mole percent, and most preferably from about 4-6 mole percent, and allylsulfonic—from about 0.1-10 mole percent, more preferably from about 0.5-8 mole percent, and most preferably from about 1-5 mole percent. These types of polymers are typically converted to partial or complete salts (preferably using cations such as alkali metal, ammonium, zinc, and mixtures thereof) at a pH of from about 0.2-4, more preferably from about 0.3-3, and most preferably from about 1-2.5.

As mentioned, these preferred Class I polymers are advantageously initially synthesized as partial sodium salts. This is due to the fact that the most preferred sulfonated repeat units are derived from the sodium salts, for reasons of cost and availability.

One preferred polymer of this type is a partial sodium salt having a pH of about 1, with a repeat unit molar composition of maleic 45 mole percent, itaconic 50 mole percent, methallylsulfonic 4 mole percent, and allylsulfonic 1 mole percent. This specific polymer is referred to herein as the "T5" polymer.

Another type of preferred polymer is a "T-20" tetrapolymer containing about 30 mole percent maleic repeat units, about 50 mole percent itaconic repeat units, and a total of about 20 mole percent sulfonated repeat units, made up of about 15 mole percent methallylsulfonate repeat units and about 5 mole percent allylsulfonate repeat units. Variants of T-20 tetrapolymers include partial salts (preferably alkali metal, ammonium, zinc, and mixtures thereof) having a pH of from about 1-3.

Syntheses of the Class I Polymers

Virtually any conventional method of free radical polymerization may be suitable for the synthesis of the Class I polymers of the invention. However, a preferred and novel synthesis may be used, which is applicable not only for the production of the Class I polymers of the invention, but also for the synthesis of polymers containing dicarboxylate repeat units and sulfonate repeat units and preferably containing at least one carbon-carbon double bond. Such types of polymers are disclosed in U.S. Pat. Nos. 5,536,311 and 5,210,163.

Generally speaking, the new synthesis methods comprise carrying out a free radical polymerization reaction between dicarboxylate and sulfonate repeat units in the presence of hydrogen peroxide and vanadium-containing species to achieve a conversion to polymer in excess of 90%, and more preferably in excess of 98%, by mole. That is, a dispersion of the dicarboxylate and sulfonated monomers is created and free radical initiator(s) are added followed by allowing the monomers to polymerize.

Preferably, the hydrogen peroxide is the sole initiator used in the reaction, but in any case, it is advantageous to conduct the reaction in the absence of any substantial quantities of other initiators (i.e., the total weight of the initiator molecules used should be about 95% by weight hydrogen peroxide, more preferably about 98% by weight, and most preferably 100% by weight thereof). Various sources of vanadium may be employed, with vanadium oxysulfates being preferred.

It has been discovered that it is most advantageous to perform these polymerization reactions in substantially aqueous dispersions (e.g., at least about 95% by weight water, more preferably at least about 98% by weight water, and most preferably 100% by weight water). The aqueous dispersions may also contain additional monomer, but only to the minor extent noted.

It has also been found that the preferred polymerization reactions may be carried out without the use of inert atmospheres, e.g., in an ambient air environment. As is well known in the art, free radical polymerization reactions in dispersions are normally conducted in a way that excludes the significant presence of oxygen. As a result, these prior techniques involve such necessary and laborious steps as degassing, inert gas blanketing of reactor contents, monomer treatments to prevent air from being present, and the like. These prior expedients add to the cost and complexity of the polymerizations, and can present safety hazards. However, in the polymerizations of the polymers of the present invention, no inert gas or other related steps are required, although they may be employed if desired.

One preferred embodiment comprises creating highly concentrated aqueous dispersions of solid monomer particles (including saturated dispersions containing undissolved monomers) at a temperature of from about 50-125° C., more preferably from about 75-110° C., and adding vanadium oxysulfate to give a vanadium concentration in the dispersion of from about 1-1000 ppm, and more preferably from about 5-500 ppm (metals basis). This is followed by the addition of hydrogen peroxide over a period of from about 30 minutes-24 hours (more preferably from about 1-5 hours) in an amount effective to achieve polymerization. This process is commonly carried out in a stirred tank reactor equipped with facilities for controlling temperature and composition, but any suitable equipment used for polymerization may be employed.

Another highly preferred and efficient embodiment involves charging a stirred tank reactor with water, followed by heating and the addition of monomers to give a dispersion having from about 40-75% w/w solids concentration. Where maleic and/or itaconic monomers are employed, they may be derived either from the corresponding acid monomers, or from in situ conversion of the anhydrides to acid in the water. Carboxylate and sulfonated monomers are preferred in their acid and/or anhydride form, although salts may be used as well. Surprisingly, it has been found that incomplete monomer dissolution is not severely detrimental to the polymerization; indeed, the initially undissolved fraction of monomers will dissolve at some time after polymerization has been initiated.

After the initial heating and introduction of monomers, the reactor contents are maintained at a temperature between about 80-125° C., with the subsequent addition of vanadium oxysulfate. Up to this point in the reaction protocol, the order of addition of materials is not critical. After introduction of vanadium oxysulfate, a hydrogen peroxide solution is added over time until substantially all of the monomers are converted to polymer. Peroxide addition may be done at a constant rate, a variable rate, and with or without pauses, at a fixed or variable temperature. The concentration of peroxide solution used is not highly critical, although the concentration on the low end should not dilute the reactor contents to the point where the reaction becomes excessively slow or impractically diluted. On the high end, the concentration should not cause difficulties in performing the polymerization safely in the equipment being used.

Preferably, the polymerization reactions of the invention are carried out to exclude substantial amounts of dissolved iron species (i.e., more than about 5% by weight of such species, and more preferably substantially less, on the order of below about 5 ppm, and most advantageously under about 1 ppm). This is distinct from certain prior techniques requiring the presence of iron-containing materials. Nonetheless, it is acceptable to carry out the polymerization of the invention in 304 or 316 stainless steel reactors. It is also preferred to exclude from the polymerization reaction any significant amounts (nor more than about 5% by weight) of the sulfate salts of ammonium, amine, alkali and alkaline earth metals, as well as their precursors and related sulfur-containing salts, such as bisulfites, sulfites, and metabisulfites. It has been found that use of these sulfate-related compounds leaves a relatively high amount of sulfates and the like in the final polymers, which either must be separated or left as a product contaminant.

The high polymerization efficiencies of the preferred syntheses result from the use of water as a solvent and without the need for other solvents, elimination of other initiators (e.g., azo, hydroperoxide, persulfate, organic peroxides) iron and sulfate ingredients, the lack of recycling loops, so that substantially all of the monomers are converted to the finished polymers in a single reactor. This is further augmented by the fact that the polymers are formed first, and subsequently, if desired, partial or complete salts can be created.

EXAMPLES

The following examples describe preferred synthesis techniques for preparing polymers; it should be understood, however, that these examples are provided by way of illustration only and nothing therein should be taken as a limitation on the overall scope of the invention.

Example 1—Exemplary Synthesis

Apparatus:

A cylindrical reactor was used, capable of being heated and cooled, and equipped with efficient mechanical stirrer, condenser, gas outlet (open to atmosphere), solids charging port, liquids charging port, thermometer and peroxide feeding tube.

Procedure: Water was charged into the reactor, stirring was initiated along with heating to a target temperature of 95° C. During this phase, itaconic acid, sodium methallylsulfonate, sodium allylsulfonate, and maleic anhydride were added so as to make a 50% w/w solids dispersion with the following monomer mole fractions:

maleic: 45%
itaconic: 35%
methallylsulfonate: 15%
allylsulfonate: 5%

When the reactor temperature reached 95° C., vanadium oxysulfate was added to give a vanadium metal concentration of 25 ppm by weight. After the vanadium salt fully dissolved, hydrogen peroxide (as 50% w/w dispersion) was added continuously over 3 hours, using the feeding tube. The total amount of hydrogen peroxide added was 5% of the dispersion weight in the reactor prior to peroxide addition. After the peroxide addition was complete, the reactor was held at 95° C. for two hours, followed by cooling to room temperature.

The resulting polymer dispersion was found to have less than 2% w/w total of residual monomers as determined by chromatographic analysis.

Example 2—Exemplary Synthesis

Apparatus:
Same as Example 1

Procedure: Water was charged into the reactor, stirring was initiated along with heating to a target temperature of 100° C. During this phase, itaconic acid, sodium methallylsulfonate, sodium allylsulfonate, and maleic anhydride were added so as to make a 70% w/w solids dispersion with the following monomer mole fractions:

maleic: 45%
itaconic: 50%
methallylsulfonate: 4%
allylsulfonate: 1%

When the reactor temperature reached 100° C., vanadium oxysulfate was added to give a vanadium metal concentration of 25 ppm by weight. After the vanadium salt fully dissolved, hydrogen peroxide (as 50% w/w dispersion) was added continuously over 3 hours, using the feeding tube. The total amount of hydrogen peroxide added was 7.5% of the dispersion weight in the reactor prior to peroxide addition. After the peroxide addition was complete, the reactor was held at 100° C. for two hours, followed by cooling to room temperature.

The resulting polymer dispersion was found to have less than 1% w/w total of residual monomers as determined by chromatographic analysis.

Example 3—Preparation of Tetrapolymer Partial Salts

A tetrapolymer calcium sodium salt dispersion containing 40% by weight polymer solids in water was prepared by the preferred free radical polymerization synthesis of the invention, using an aqueous monomer reaction mixture having 45 mole percent maleic anhydride, 35 mole percent itaconic acid, 15 mole percent methallylsulfonate sodium salt, and 5 mole percent allylsulfonate. The final tetrapolymer dispersion had a pH of slightly below 1.0 and was a partial sodium salt owing to the sodium cation on the sulfonate monomers. At least about 90% of the monomers were polymerized in the reaction.

This sodium partial salt tetrapolymer was used to create 40% solids in water calcium salts. In each instance, apart from the sodium present in the tetrapolymer mixture, appropriate bases or base precursors (e.g., carbonates), or mixtures thereof were added to the aqueous tetrapolymer at room temperature to generate the corresponding salts. Specifically, the following basic reactants were employed with quantities of the tetrapolymer to give the following salts:

Salt A—calcium carbonate and a minor amount of sodium hydroxide, pH 1.5.
Salt B—calcium carbonate and a minor amount of sodium hydroxide, pH 3.5.

Example 4—Exemplary Synthesis—Class IA Polymer

A terpolymer salt dispersion containing 70% by weight polymer solids in water was prepared using a cylindrical reactor capable of being heated and cooled, and equipped with an efficient mechanical stirrer, a condenser, a gas outlet open to the atmosphere, respective ports for charging liquids and solids to the reactor, a thermometer, and a peroxide feeding tube.

Water (300 g) was charged into the reactor with stirring and heating to a target temperature of 95° C. During heating, itaconic acid, sodium methallylsulfonate, and maleic anhydride were added so as to make a 75% w/w solids dispersion with the following monomer mole fractions: maleic anhydride-20%; itaconic acid-60%; methallylsulfonate sodium salt-20%. When the monomers were initially added, they were in suspension in the water. As the temperature rose, the monomers became more fully dissolved before polymerization was initiated, and the maleic anhydride was hydrolyzed to maleic acid. When the reactor temperature reached 95° C., vanadium oxysulfate was added to yield a vanadium metal concentration of 50 ppm by weight of the reactor contents at the time of addition of the vanadium salt. After the vanadium salt fully dissolved, hydrogen peroxide was added as a 50% w/w dispersion in water continuously over two hours. At the time of hydrogen peroxide addition, not all of the monomers were completely dissolved, achieving what is sometimes referred to as "slush polymerization"; the initially undissolved monomers were subsequently dissolved during the course of the reaction. The total amount of hydrogen peroxide added equaled 5% of the dispersion weight in the reactor before addition of the peroxide.

After the peroxide addition was completed, the reaction mixture was held at 95° C. for two hours, and then allowed to cool to room temperature. The resulting polymer dispersion had a pH of slightly below 1.0 and was a partial sodium salt owing to the sodium cation on the sulfonate monomers. The dispersion was found to have a monomer content of less than 2% w/w, calculated as a fraction of the total solids in the reaction mixture, as determined by chromatographic analysis. Accordingly, over 98% w/w of the initially added monomers were converted to polymer.

Further disclosure pertaining to the Class I polymers and uses thereof is set forth in application Ser. No. 62/001,110, filed May 21, 2014, which is fully incorporated by reference herein.

Class IA Polymers

Class IA polymers contain both carboxylate and sulfonate functional groups, but are not the tetra- and higher order polymers of Class I. For example, terpolymers of maleic, itaconic, and allylsulfonic repeat units, which are per se known in the prior art, will function as the polyanionic polymer component of the compositions of the invention. The Class IA polymers thus are normally homopolymers, copolymers, and terpolymers, advantageously including repeat units individually and independently selected from the group consisting of type B, type C, and type G repeat units, without the need for any additional repeat units. Such polymers can be synthesized in any known fashion, and can also be produced using the previously described Class I polymer synthesis.

Class IA polymers preferably have the same molecular weight ranges and the other specific parameters (e.g., pH and polymer solids loading) previously described in connection with the Class I polymers, and may be converted to partial or complete salts using the same techniques described with reference to the Class I polymers.

Class II Polymers

Broadly speaking, the polyanionic polymers of this class are of the type disclosed in U.S. Pat. No. 8,043,995, which is incorporated by reference herein in its entirety. The polymers include repeat units derived from at least two different monomers individually and respectively taken from the group consisting of what have been denominated for ease of reference as B' and C' monomers; alternately, the polymers may be formed as homopolymers or copolymers from recurring C' monomers. The repeat units may be randomly distributed throughout the polymer chains.

In detail, repeat unit B' is of the general formula

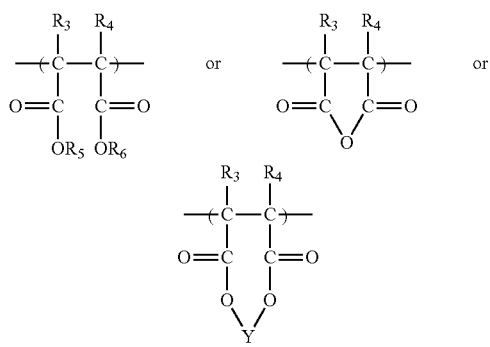

and repeat unit C' is of the general formula

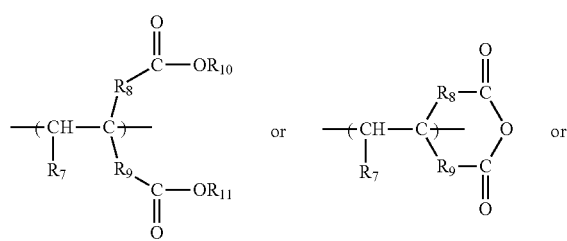

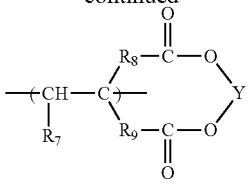

wherein each $R_7$ is individually and respectively selected from the group consisting of H, OH, $C_1$-$C_{30}$ straight, branched chain and cyclic alkyl or aryl groups, $C_1$-$C_{30}$ straight, branched chain and cyclic alkyl or aryl formate ($C_0$), acetate ($C_1$), propionate ($C_2$), butyrate ($C_3$), etc. up to $C_{30}$ based ester groups, R'CO$_2$ groups, OR' groups and COOX groups, wherein R' is selected from the group consisting of $C_1$-$C_{30}$ straight, branched chain and cyclic alkyl or aryl groups and X is selected from the group consisting of H, the alkali metals, NH$_4$ and the $C_1$-$C_4$ alkyl ammonium groups, $R_3$ and $R_4$ are individually and respectively selected from the group consisting of H, $C_1$-$C_{30}$ straight, branched chain and cyclic alkyl or aryl groups, $R_5$, $R_6$, $R_{10}$ and $R_{11}$ are individually and respectively selected from the group consisting of H, the alkali metals, NH$_4$ and the $C_1$-$C_4$ alkyl ammonium groups, Y is selected from the group consisting of Fe, Mn, Mg, Zn, Cu, Ni, Co, Mo, V, W, the alkali metals, the alkaline earth metals, polyatomic cations containing any of the foregoing (e.g., VO$^{+2}$), amines, and mixtures thereof; and $R_8$ and $R_9$ are individually and respectively selected from the group consisting of nothing (i.e., the groups are non-existent), CH$_2$, C$_2$H$_4$, and C$_3$H$_6$.

As can be appreciated, the Class II polymers typically have different types and sequences of repeat units. For example, a Class II polymer comprising B' and C' repeat units may include all three forms of B' repeat units and all three forms of C' repeat units. However, for reasons of cost and ease of synthesis, the most useful Class II polymers are made up of B' and C' repeat units. In the case of the Class II polymers made up principally of B' and C' repeat units, $R_5$, $R_6$, $R_{10}$, and $R_{11}$ are individually and respectively selected from the group consisting of H, the alkali metals, NH$_4$, and the $C_1$-$C_4$ alkyl ammonium groups. This particular Class II polymer is sometimes referred to as a butanedioic methylenesuccinic acid copolymer and can include various salts and derivatives thereof.

The Class II polymers may have a wide range of repeat unit concentrations in the polymer. For example, Class II polymers having varying ratios of B':C' (e.g., 10:90, 60:40, 50:50 and even 0:100) are contemplated and embraced by the present invention. Such polymers would be produced by varying monomer amounts in the reaction mixture from which the final product is eventually produced and the B' and C' type repeat units may be arranged in the polymer backbone in random order or in an alternating pattern.

The Class II polymers may have a wide variety of molecular weights, ranging for example from 500-5,000,000, depending chiefly upon the desired end use. Additionally, n can range from about 1-10,000 and more preferably from about 1-5,000.

Preferred Class II polymers are usually synthesized using dicarboxylic acid monomers, as well as precursors and derivatives thereof. For example, polymers containing mono and dicarboxylic acid repeat units with vinyl ester repeat units and vinyl alcohol repeat units are contemplated; however, polymers principally comprised of dicarboxylic acid repeat units are preferred (e.g., at least about 85%, and more preferably at least about 93%, of the repeat units are of this character). Class II polymers may be readily complexed with salt-forming cations using conventional methods and reactants.

Synthesis of the Class II Polymers of the Invention

In general, the Class II polymers are made by free radical polymerization serving to convert selected monomers into the desired polymers with repeat units. Such polymers may be further modified to impart particular structures and/or properties. A variety of techniques can be used for generating free radicals, such as addition of peroxides, hydroperoxides, azo initiators, persulfates, percarbonates, per-acid, charge transfer complexes, irradiation (e.g., UV, electron beam, X-ray, gamma-radiation and other ionizing radiation types), and combinations of these techniques. Of course, an extensive variety of methods and techniques are well known in the art of polymer chemistry for initiating free-radical polymerizations. Those enumerated herein are but some of the more frequently used methods and techniques. Any suitable technique for performing free-radical polymerization is likely to be useful for the purposes of practicing the present invention.

The polymerization reactions are carried out in a compatible solvent system, namely a system which does not unduly interfere with the desired polymerization, using essentially any desired monomer concentrations. A number of suitable aqueous or non-aqueous solvent systems can be employed, such as ketones, alcohols, esters, ethers, aromatic solvents, water and mixtures thereof. Water alone and the lower ($C_1$-$C_4$) ketones and alcohols are especially preferred, and these may be mixed with water if desired. In some instances, the polymerization reactions are carried out with the substantial exclusion of oxygen, and most usually under an inert gas such as nitrogen or argon. There is no particular criticality in the type of equipment used in the synthesis of the polymers, i.e., stirred tank reactors, continuous stirred tank reactors, plug flow reactors, tube reactors and any combination of the foregoing arranged in series may be employed. A wide range of suitable reaction arrangements are well known to the art of polymerization.

In general, the initial polymerization step is carried out at a temperature of from about 0° C. to about 120° C. (more preferably from about 30° C. to about 95° C. for a period of from about 0.25 hours to about 24 hours and even more preferably from about 0.25 hours to about 5 hours). Usually, the reaction is carried out with continuous stirring.

After the polymerization reaction is complete, the Class II polymers may be converted to partial or saturated salts using conventional techniques and reactants.

Preferred Class II Maleic-Itaconic Polymers

The most preferred Class II polymers are composed of maleic and itaconic B' and C' repeat units and have the generalized formula

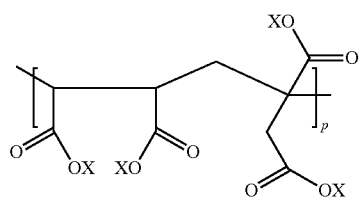

where X is either H or another salt-forming cation, depending upon the level of salt formation.

In a specific example of the synthesis of a maleic-itaconic Class II polymer, acetone (803 g), maleic anhydride (140 g), itaconic acid (185 g) and benzoyl peroxide (11 g) were stirred together under inert gas in a reactor. The reactor provided included a suitably sized cylindrical jacketed glass reactor with mechanical agitator, a contents temperature measurement device in contact with the contents of the reactor, an inert gas inlet, and a removable reflux condenser. This mixture was heated by circulating heated oil in the reactor jacket and stirred vigorously at an internal temperature of about 65-70° C. This reaction was carried out over a period of about 5 hours. At this point, the contents of the reaction vessel were poured into 300 g water with vigorous mixing. This gave a clear solution. The solution was subjected to distillation at reduced pressure to drive off excess solvent and water. After sufficient solvent and water have been removed, the solid product of the reaction precipitates from the concentrated solution, and is recovered. The solids are subsequently dried in vacuo. A schematic representation of this reaction is shown below.

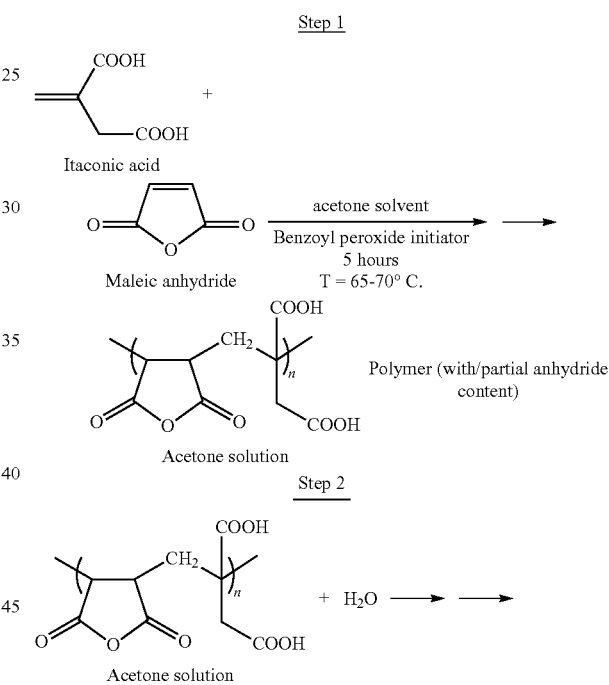

Fully Hydrolyzed Acid Form Polymer, Aqueous Solution

Once again, the Class II polymers should have the same preferred characteristics as those of the Class I and Class IA polymers set forth above.

The Boron Compounds

The boron compounds used in the compositions of the invention include boric acid in all forms thereof (e.g., boric acid $H_3BO_3$, metaboric acid $HBO_2$, and tetraboric acid $H_2B_4O_7$), and borates and polyborates which are generally the salts of the oxyacids of boron. Preferred borates include the alkali metal and alkaline earth metal borates. Boric acid is the most preferred compound for use in the compositions hereof. Mixtures of any of the foregoing are also useful.

Generally, the boron compounds are present in the compositions of the invention at levels of from about 2.5-7.5% by weight, more preferably from about 3-5% by weight.

The Boron Compound Dispersants or Solvents

The compositions of the invention also include one or more boron compound dispersants or solvents, which permit incorporation of greater amounts of boron compounds into polymeric compositions than heretofore possible while maintaining the compounds in solution. It has been found that there are four general types of useful dispersants solvents.

Type I

The Type I dispersants or solvents are saturated aliphatic diols and glycols, namely compounds having two hydroxyl groups, which are essentially free of carbon-carbon double bonds. Preferred diols include C2-C8, more preferably C2-C6, saturated diols where the carbon atom chains may be linear or branched. Exemplary preferred diols are propanediols and butanediols. Preferred glycols include ethylene and neopentyl glycols. The most preferred Type I dispersant or solvent is 1,2-propanediol owing to its availability, relatively low cost, favorable toxicity and environmental qualities, and ease of handling.

Type II

The Type II dispersants or solvents are saturated compounds having three or more hydroxyl groups, which are essentially free of carbon-carbon double bonds; the arrangement of the hydroxyl groups thereon is immaterial. The number of carbon atoms in the Type II dispersants or solvents is unrestricted, but preferably compounds should have no more than five carbon atoms on average for each hydroxyl group present on the molecule. The most preferred Type II dispersants or solvents are glycerol and pentaerythritol. Polyvinyl alcohols may also be used as Type II dispersants, either alone or mixed with other such dispersants; however, certain pH considerations come into play when PVA's are used.

Type III

The Type III dispersants or solvents are saturated aliphatic alpha-hydroxy acids, which are essentially free of double bonds and carbon ring structures, including both aliphatic and aromatic ring structures. Such alpha-hydroxy acids possess at least one carboxylic acid functional group and have at least one hydroxyl group on the carbon atom adjacent to the carboxylate group. Especially preferred dispersants or solvents of this character include lactic acid (D, L, or racemic mixtures are useful), glycolic acid, citric acid, tartaric acid, tartronic acid, glyceric acid, and dihydroxypropanedioic acid. The Type III alpha-hydroxy acids may have more than one carboxylic acid functional group per molecule, more than one alphahydroxyl group, or any combination thereof.

The Type III dispersants or solvents have the advantage of being quite acidic and, in some situations and with some fertilizer products, this may be quite useful. In other instances, it may be desirable to have dispersants or solvents with a higher pH, and in these cases the other types of dispersants or solvents may be used; however, even where higher pH compositions are desired, small amounts of the Type III dispersants or solvents may be employed.

Type IV

The Type IV dispersants or solvents are saturated compounds having three or more hydroxyl groups and which are essentially free of carbon-carbon double bonds, with such compounds also having a carbon atom to hydroxyl group mole ratio of form about 1.8:1 to 2.5:1. Compounds within this Type include polyvinyl alcohols ("PVAs"), but also include non-PVA compounds. The most important factor in Type IV dispersants or solvents is the above-recited carbon atom/hydroxyl ratio mole ratio.

As used herein with respect to the Type I, Type II, Type III, and Type IV dispersants or solvents, "essentially free" refers to the fact that the dispersants or solvents have no more than about 5 mole percent of double bonds and/or ring structures, and more preferably no more than about 1 mole percent thereof. Most advantageously, these solvents are entirely free of carbon-carbon double bonds and (in the case of Type III dispersants or solvents) ring structures.

It is quite possible to use various mixtures of the Type I, Type II, Type III, and Type IV boron compound dispersants or solvents in compositions in accordance with the invention. There is no practical limit upon the number of different boron compound dispersants or solvents which can be used in a given compositions. It has also been found that the stereochemistry of the various dispersants or solvents is not a limitation upon the invention.

In general, the boron compound dispersant(s) or solvent (s) should be present at a level of from about 5-50% w/w, more preferably from about 15-40% w/w, in the compositions of the invention. The precise levels of use for a given composition can be readily determined through routine experimentation.

EXAMPLES

The following examples set forth preferred compositions and methods in accordance with the invention. It is to be understood, however, that these examples are provided by way of illustration only, and nothing therein should be taken as a limitation on the overall scope of the invention.

Example 5

A mixture was prepared by sequential addition of the following components to a closed vessel with vigorous stirring, and in listed order:
1. 1:1 (by mole) copolymer of maleic acid and itaconic acid as a partial calcium salt in aqueous solution, having a pH of about 2 and about 65% solids,
2. propylene glycol,
3. DL-lactic acid containing 85% actives,
4. boric acid.

The resulting mixture had copolymer solids at a level of about 35% w/w, propylene glycol at a level of about 5% w/w, DL-lactic acid at a level of about 25% w/w, and boric acid at a level of about 4.8% w/w, with the balance of the mixture being water. The final mixture was a complete and essentially homogeneous solution at room temperature.

Example 6

A mixture was prepared by sequential addition of the following components to a closed vessel with vigorous stirring, and in listed order:
1. 1:1 (by mole) copolymer of maleic acid and itaconic acid as a partial calcium salt in aqueous solution, having a pH of about 1.2 and about 65% solids,
2. glycolic acid, 70% actives,
3. boric acid.

The resulting mixture had copolymer solids at a level of about 35% w/w, glycolic acid at a level of about 25% w/w, and boric acid at a level of about 4.5% w/w, with the balance of the mixture being water. The final mixture was a complete and essentially homogeneous solution at room temperature.

Example 7

A mixture was prepared by sequential addition of the following components to a closed vessel with vigorous stirring, and in listed order:
1. 1:1 (by mole) copolymer of maleic acid and itaconic acid as a partial calcium salt in aqueous solution, having a pH of about 1.2 and about 65% solids,
2. propylene glycol,
3. boric acid.

The resulting mixture had copolymer solids at a level of about 36.5% w/w, propylene glycol at a level of about 35% w/w, and boric acid at a level of about 3.5% w/w, with the balance of the mixture being water. The final mixture was a complete and essentially homogeneous solution at room temperature, and was unaffected by storage at 0° C. over 72 hours.

Example 8

A mixture was prepared by sequential addition of the following components to a closed vessel with vigorous stirring, and in listed order:
1. 1:1 (by mole) copolymer of maleic acid and itaconic acid as a partial calcium salt in aqueous solution, having a pH of about 1.2 and about 65% solids,
2. propylene glycol,
3. glycerol,
4. boric acid.

The resulting mixture had copolymer solids at a level of about 36.5% w/w, propylene glycol at a level of about 30% w/w, glycerol at a level of about 5% w/w, and boric acid at a level of about 3.5% w/w, with the balance of the mixture being water. The final mixture was a complete and essentially homogeneous solution at room temperature, and was unaffected by storage at 0° C. over 72 hours.

Example 9

A mixture was prepared by sequential addition of the following components to a closed vessel with vigorous stirring, and in listed order:
1. 1:1 (by mole) copolymer of maleic acid and itaconic acid as a partial calcium salt in aqueous solution, having a pH of about 1.2 and about 65% solids,
2. DL-lactic acid containing 85% actives,
3. propylene glycol,
4. boric acid,
5. Acid Orange #7 dye solution, 40% actives.

The resulting mixture had copolymer solids at a level of about 35% w/w, DL-lactic acid at a level of about 25%, propylene glycol at a level of about 5% w/w, boric acid at a level of about 4.5% w/w, and dye actives at a level of about 0.5% w/w, with the balance of the mixture being water. The final mixture was a complete and essentially homogeneous solution at room temperature.

Example 10

A mixture was prepared by sequential addition of the following components to a closed vessel with vigorous stirring, and in listed order:
1. 1:1 (by mole) copolymer of maleic acid and itaconic acid as a partial calcium salt in aqueous solution, having a pH of about 1.2 and about 65% solids,
2. low molecular weight polyvinyl alcohol (PVA) with about 99% hydrolysis level, as a 30% solids solution in water,
3. DL-lactic acid containing 85% actives,
4. propylene glycol,
5. boric acid,
6. Acid Orange #7 dye solution, 40% actives.

The resulting mixture had copolymer solids at a level of about 33% w/w, PVA at a level of about 2% w/w, DL-lactic acid at a level of about 5%, propylene glycol at a level of about 5% w/w, boric acid at a level of about 3.5% w/w, and dye actives at a level of about 1.5% w/w, with the balance of the mixture being water. The final mixture was a complete and essentially homogeneous solution at room temperature, and was highly colored.

Example 11

A mixture was prepared by sequential addition of the following components to a closed vessel with vigorous stirring, and in listed order:
1. 1:1 (by mole) copolymer of maleic acid and itaconic acid as a partial calcium salt in aqueous solution, having a pH of about 1.2 and about 65% solids,
2. low molecular weight PVA with about 99% hydrolysis level, as a 30% solids solution in water,
3. propylene glycol,
4. boric acid,
5. Acid Orange #7 dye solution, 40% actives.

The resulting mixture had copolymer solids at a level of about 33% w/w, PVA at a level of about 2% w/w/, propylene glycol at a level of about 10% w/w, boric acid at a level of about 3.5% w/w, and dye actives at a level of about 1.5% w/w, with the balance of the mixture being water. The final mixture was a complete and essentially homogeneous solution at room temperature, and was highly colored.

Examples 5-9 illustrate general-use compositions, whereas Examples 10 and 11 are generally intended for use with granular nitrogen fertilizers so as to enhance the uptake of the fertilizer nutrients by plants.

Comparative Example

The following example exemplifies a prior art composition containing boric acid, and illustrates the difficulty of solubilizing large amounts of boric acid.

Example 12—Prior Art

A 1:1 (by mole) copolymer of maleic acid and itaconic acid partial calcium salt aqueous solution was prepared, with a pH of about 1.2 and a solids concentration of 38% w/w, in the amount of 97.00 g. To this was added, at room temperature with vigorous stirring, in a closed vessel, 3.00 g of boric acid. The stirring was conducted over 24 hours at room temperature. The resulting mixture contained visible undissolved boric acid solids. The liquid fraction of the mixture was separated by filtration from undissolved boric acid, tested for boric acid content, and found to contain about 2.7% w/w boric acid. When a filtered sample of this material was cooled to about 0° C. and held for 24 hours to simulate product storage at low temperatures, significant additional boric acid precipitation was observed. This boron-supplemented copolymer did not have the desired amount of boron retained in the solution.

Fertilizer Formulations Using the Boron Compositions

The boron-containing compositions are particularly suited for use with fertilizers in order to improve the functionality thereof. A wide variety of fertilizers may be used in this context, for example, fertilizer products including but not limited to phosphate-based fertilizers such as MAP, DAP, triple superphosphate, ordinary superphosphate, any one of a number of well known N—P—K fertilizer products, and/or fertilizers containing nitrogen materials such as ammonia (anhydrous or aqueous), ammonium nitrate, ammonium sulfate, urea, ammonium phosphates, sodium nitrate, calcium nitrate, potassium nitrate, nitrate of soda, urea formaldehyde, metal (e.g., zinc, iron) ammonium phosphates; phosphorous materials such as calcium phosphates (normal phosphate and super phosphate), ammonium phosphate, ammoniated super phosphate, phosphoric acid, superphosphoric acid, basic slag, rock phosphate, colloidal phosphate, bone phosphate; potassium materials such as potassium chloride, potassium sulfate, potassium nitrate, potassium phosphate, potassium hydroxide, potassium carbonate; calcium materials, such as calcium sulfate, calcium carbonate, calcium nitrate; magnesium materials, such as magnesium carbonate, magnesium oxide, magnesium sulfate, magnesium hydroxide; sulfur materials such as ammonium sulfate, sulfates of other fertilizers discussed herein, ammonium thiosulfate, elemental sulfur (either alone or included with or coated on other fertilizers); micronutrients such as Zn, Mn, Cu, Fe, B, Mo, and other micronutrients discussed herein; oxides, sulfates, chlorides, and chelates of such micronutrients (e.g., zinc oxide, zinc sulfate and zinc chloride); such chelates sequestered onto other carriers such as EDTA; boron materials such as boric acid, sodium borate or calcium borate; organic wastes and waste waters such as manure, sewage, food processing industry by-products, and pulp and paper mill by-products; and molybdenum materials such as sodium molybdate. As known in the art, these fertilizer products can exist as dry powders/granules or as water dispersions. The fertilizers may be of the conventional variety, or they may be starter fertilizers. The single most preferred fertilizer products are granular urea or UAN, and composites made up of urea and the polymeric boron compositions inhibit urease reactions which can otherwise significantly degrade urea performance.

In one series of tests, the urease inhibition properties of polymeric boron compositions were determined, as compared with an urease standard without any polymeric boron composition therein. In these tests, comparative urease activity experiments was prepared using 10 mL reaction volumes of deionized water and a reaction buffer of 2 mM Hepes (pH 7). 2.5 nM of Jack Bean urease was added to each reaction volume along with 100 mM of urea as the standard, and the same composition with increasing amounts of polymeric boron compositions. The first polymeric boron composition comprises 35.5% by volume of the preferred Class I polymer in the form of a partial salt of Na and Ca, with 4.5% boric acid by volume and 30% by volume lactic acid (pH 0-1). In the second polymeric boron composition, the same ingredients were used, but with the addition of 1.5% by volume low molecular weight PVA. In the two polymeric boron composition tests, increasing amounts of the composition were used, namely 1%, 2%, and 4% (v/v). The inhibitory effect of the polymeric boron compositions on urease was measured using a titration method (pH-stat titrimeter), wherein while the urease catalysed urea hydrolysis reaction was occurring over a three-minute reaction period, trisHCl was injected as titrint into the reaction mixtures in order to maintain the pH at a constant value. Knowing the HCl concentration and the volume used in the unit time, urease activity was determined. The standard urease test gave a value of approximately 33 activity units, whereas with the first polymeric boron composition, the urease activity decreased to about 7 units at 1% addition, about 5 units at 2% addition, and about 2 units at 4% addition. The second polymeric boron compositions with PVA reduced the urease activity about 7 units at 1% addition, about 5 units at 2% addition, and about 3 units at 4% addition.

In such contexts, the polymeric boron compositions may be mixed with the fertilizer products, applied as a surface coating to the fertilizer products, or otherwise thoroughly mixed with the fertilizer products. Preferably, in such combined fertilizer/polymeric boron compositions, the compositions are present at a level of from about 0.001 g to about 20 g polymeric boron composition per 100 g phosphate-based fertilizer, more preferably from about 0.1 g to about 10 g polymeric boron composition per 100 g phosphate-based fertilizer, and still more preferably from about 0.5 g to about 2 g polymeric boron composition per 100 g phosphate-based fertilizer. The polymeric fraction of such combined products may include the polymers defined above, or such polymers complexed with metal or non-metal counter ions such as those selected from the group consisting of the amines, alkali metals, Fe, Mn, Mg, Zn, Cu, Ni, Co, Mo, V, Cr, Si, B, Ca, and compounds containing these cations, e.g., boric acid, borates, molybdates, more complex cations such as vanadyl ions $[VO]^{2+}$, and other complex ions containing vanadium, and mixtures of any of the foregoing. As used herein, "amines" refers to primary, secondary, or tertiary amines, monoamines, diamines, and triamines, as well as ammonia, ammonium ions, quaternary amines, quaternary ammonium ions, alkanolamines (e.g., ethanolamine, diethanolamine, and triethanolamine), and tetraalkylammonium species.

In the case of the combined fertilizer/polymeric boron products, the combined product is applied at a level so that the polymer fraction is applied at a level of from about 0.001 to about 20 lbs. polymer per acre of growing plants, more preferably from about 0.01 to about 10 lbs polymer per acre of growing plants, and still more preferably from about 0.5 to about 2 lbs polymer per acre of growing plants. The combined products can likewise be applied as liquid dispersions or as dry granulated products, at the discretion of the user. When polymer/boron compositions in accordance with the present invention are used as a fertilizer coating, the polymer comprises between about 0.005% and about 15% by weight of the coated fertilizer product, more preferably the polymer comprises between about 0.01% and about 10% by weight of the coated fertilizer product, and most preferably between 0.5% and about 1% by weight of the coated fertilizer product.

Dilute aqueous dispersions in accordance with the invention may also be used as foliar sprays for supplying boron directly to growing plants. Furthermore, these dispersions may be added to conventional pesticide treatments and applied to growing crops. In these applications, the liquid compositions of the invention as described above may be diluted to the extent necessary to provide the desired level of boron supplementation to plants.

We claim:

1. An aqueous liquid composition comprising:
   a polyanionic polymer present at a level of from about 25-45% by weight;
   a boron compound present at a level of from about 3-5% by weight; and
   a boron compound dispersant or solvent present at a level of from about 15-40% by weight, said dispersant or solvent selected from the group consisting of: (1) saturated aliphatic diols, glycols, and mixtures thereof which are essentially free of carbon-carbon double bonds; (2) saturated compounds having three or more hydroxyl groups and which are essentially free of carbon-carbon double bonds and are selected from the group consisting of low molecular weight (MW) polyvinyl alcohols (PVAs) and non-PVA compounds; (3) aliphatic alpha-hydroxy acids essentially free of carbon-carbon double bonds and ring structures; and (4) mixtures of the foregoing,
   wherein all of said weight percentages are based upon the total weight of the composition taken as 100% by weight;
   said polyanionic polymer, boron compound, and boron compound dispersant or solvent, being in aqueous dispersion or solution,
   said composition operable to maintain the boron compound content thereof in stable dispersion or solution for a period of at least about 72 hours at ambient temperature without stirring.

2. The composition of claim 1, said polyanionic polymer having at least about 10% anionic groups by mole fraction capable of reacting with multivalent metal cations.

3. The composition of claim 2, said polyanionic polymer having at least about 25% anionic groups by mole fraction capable of reacting with multivalent metal cations.

4. The composition of claim 1, said polyanionic polymer having carboxylic and sulfonic anionic groups.

5. The composition of claim 1, said polyanionic polymer including maleic, itaconic, and sulfonate repeat units.

6. The composition of claim 5, said polyanionic polymer being at least a tetrapolymer comprising at least four different repeat units individually and independently selected from the group consisting of type B, type C, and type G repeat units, and mixtures thereof, wherein:
   said type B repeat units selected from the group consisting of repeat units derived from substituted and unsubstituted monomers of maleic acid and/or anhydride, fumaric acid and/or anhydride, mesaconic acid and/or anhydride, mixtures of the foregoing, and any isomers, esters, acid chlorides, and partial or complete salts of any of the foregoing, wherein type B repeat units may be substituted with one or more C1-C6 straight or branched chain alkyl groups substantially free of ring structures and halo atoms, and wherein the salts have salt-forming cations selected from the group consisting of metals, amines, and mixtures thereof,
   said type C repeat units selected from the group consisting of repeat units derived from substituted or unsubstituted monomers of itaconic acid, itaconic anhydride, and any isomers, esters, and the partial or complete salts of any of the foregoing, and mixtures of any of the foregoing, wherein the type C repeat units may be substituted with one or more C1-C6 straight or branched chain alkyl groups substantially free of ring structures and halo atoms, and wherein the salts have salt-forming cations selected from the group consisting of metals, amines, and mixtures thereof,
   said type G repeat units selected from the group consisting of repeat units derived from substituted or unsubstituted sulfonated monomers possessing at least one carbon-carbon double bond and at least one sulfonate group and which are substantially free of aromatic rings and amide groups, and any isomers, and the partial or complete salts of any of the foregoing, and mixtures of any of the foregoing, wherein type G repeat units may be substituted with one or more C1-C6 straight or branched chain alkyl groups substantially free of ring structures and halo atoms, and wherein the salts of the type G repeat units have salt-forming cations selected from the group consisting of metals, amines, and mixtures thereof.

7. The composition of claim 6, said polyanionic polymer being a tetrapolymer wherein at least about 90 mole percent of the repeat units therein are selected from the group consisting of type B, C, and G repeat units, and mixtures thereof.

8. The composition of claim 7, wherein at least about 96 mole percent of the repeat units therein are selected from the group consisting of type B, C, and G repeat units, and mixtures thereof.

9. The composition of claim 8, wherein the repeat units consist essentially of repeat units selected from the group consisting of type B, C, and G repeat units, and mixtures thereof.

10. The composition of claim 6, wherein said polyanionic polymer is substantially free of ester groups.

11. The composition of claim 6, said polyanionic polymer having one type B repeat unit, one type C repeat unit, and two different type G repeat units.

12. The composition of claim 6, said polyanionic polymer being a tetrapolymer, said one type B repeat unit is derived from maleic acid, said one type C repeat unit is derived from itaconic acid, and two type G repeat units are respectively derived from methallyl sulfonic acid and allyl sulfonic acid.

13. The composition of claim 12, said type B repeat unit being present at a level of from about 35-50 mole percent, said type C repeat unit being present at a level of from about 20-55 mole percent, said type G repeat unit derived from methallyl sulfonic acid being present at a level of from about 1-25 mole percent, and said type G repeat unit derived from allyl sulfonic acid being present at a level of from about 1-20 mole percent, where the total amount of all of the repeat units in the polymer is taken as 100 mole percent.

14. The composition of claim 6, said polyanionic polymer having two different type B repeat units, one type C repeat unit, and one type G repeat unit.

15. The composition of claim 6, said polyanionic polymer having at least one repeat unit not selected from the group consisting of type B, type C, and type G repeat units.

16. The composition of claim 6, wherein the total amount of type B repeat units in said polyanionic polymer is from about 1-70 mole percent, the total amount of type C repeat units in said polyanionic polymer is from about 1-80 mole percent, and the total amount of type G repeat units in said polyanionic polymer is from about 1-65 mole percent, where the total amount of all of the repeat units in the polyanionic polymer is taken as 100 mole percent.

17. The composition of claim 16, the total amount of type B repeat units in said polyanionic polymer is from about 20-65 mole percent, the total amount of type C repeat units in said polyanionic polymer is from about 15-75 mole percent, and the total amount of type G repeat units in said polyanionic polymer is from about 10-55 mole percent, where the total amount of all of the repeat units in the polyanionic polymer is taken as 100 mole percent.

18. The composition of claim 6, said polyanionic polymer having a molecular weight of from about 800-50,000.

19. The composition of claim 6, said polyanionic polymer being in a free acid form.

20. The composition of claim 6, said polyanionic polymer being in partial or complete salt form, including one or more salt-forming cations bound with the polyanionic polymer.

21. The composition of claim 20, said salt-forming cation selected from the group consisting of cations of metals, amines, and mixtures thereof.

22. The composition of claim 21, said metal cations selected from the group consisting of alkali, alkaline earth, and transition metal cations.

23. The composition of claim 21, said amine cations selected from the group consisting of primary, secondary, tertiary, and quaternary amines, diamines, triamines, alkanolamines, and tetraalkylammonium species.

24. The composition of claim 1, said polyanionic polymer derived from at least two different monomers individually and respectively taken from the group consisting of B' and C' monomers, or from recurring, different C' monomers, wherein repeat unit B' is of the general formula

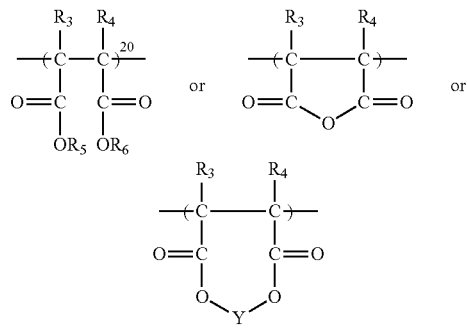

and repeat unit C' is of the general formula

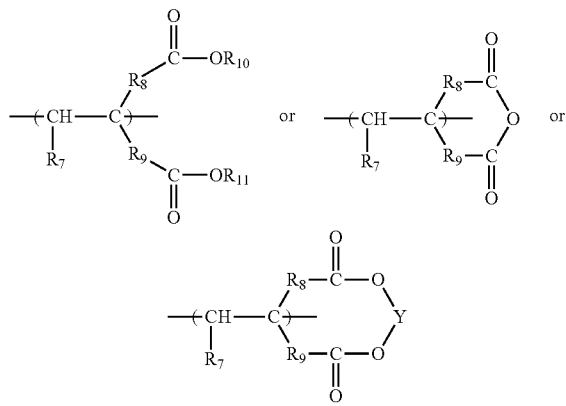

wherein each $R_7$ is individually and respectively selected from the group consisting of H, OH, $C_1$-$C_{30}$ straight, branched chain and cyclic alkyl or aryl groups, $C_1$-$C_{30}$ straight, branched chain and cyclic alkyl or aryl formate ($C_0$), acetate ($C_1$), propionate ($C_2$), butyrate ($C_3$), etc., up to $C_{30}$ based ester groups, R'CO$_2$ groups, OR' groups and COOX groups, wherein R' is selected from the group consisting of $C_1$-$C_{30}$ straight, branched chain and cyclic alkyl or aryl groups and X is selected from the group consisting of H, the alkali metals, NH$_4$ and the $C_1$-$C_4$ alkyl ammonium groups, $R_3$ and $R_4$ are individually and respectively selected from the group consisting of H, $C_1$-$C_{30}$ straight, branched chain and cyclic alkyl or aryl groups, $R_5$, $R_6$, $R_{10}$ and $R_{11}$ are individually and respectively selected from the group consisting of H, the alkali metals, NH$_4$ and the $C_1$-$C_4$ alkyl ammonium groups, Y is selected from the group consisting of Fe, Mn, Mg, Zn, Cu, Ni, Co, Mo, V and Ca, and $R_8$ and $R_9$ are individually and respectively selected from the group consisting of nothing (i.e., the groups are non-existent), CH$_2$, C$_2$H$_4$, and C$_3$H$_6$.

25. The composition of claim 24, said polyanionic polymer having the generalized formula

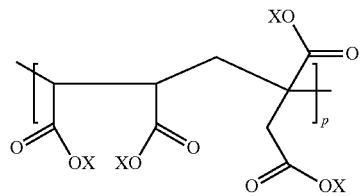

where X is a cation and p range from about 10-500.

26. The composition of claim 24, said polyanionic polymer being a maleic-itaconic polymer.

27. The composition of claim 1, said boron compound selected from the group consisting of all forms of boric acid, borates, polyborates, and mixtures thereof.

28. The composition of claim 27, said boron compound selected from the group consisting of alkali metal and alkaline earth metal borates.

29. The composition of claim 27, said boron compound being boric acid (H$_3$BO$_3$).

30. The composition of claim 1, said boron compound dispersant or solvent selected from the group consisting of 1,2-propanediol, glycerol, pentaerythritol, lactic acid, citric acid, tartaric acid, tartronic acid, glycolic acid, glyceric acid, dihydroxypropanedioic acid, and mixtures thereof.

31. The composition of claim 1, said polyanionic polymer comprising a copolymer or terpolymer containing both carboxylate and sulfonate functional groups.

32. A fertilizer formulation comprising the composition of claim 1 mixed with a fertilizer comprising urea in liquid form, wherein the boron compound dispersant(s) or solvent(s) are compatible with said fertilizer.

33. A method of fertilizing soil comprising the step of applying the formulation of claim 32 to soil.

34. A method of providing boron to growing plants comprising the step of applying the formulation of claim 32 directly onto plants.

35. The composition of claim 1, wherein the saturated aliphatic diols, glycols, and mixtures thereof are selected from the group consisting of propanediols, butanediols, ethylene glycols and neopentyl glycols.

36. The composition of claim 1, wherein the saturated compounds having three or more hydroxyl groups are non-PVA compounds selected from the group consisting of glycerol and pentaerythritol.

37. The composition of claim 1, wherein the aliphatic alpha-hydroxy acids are selected from the group consisting of lactic acid, glycolic acid, citric acid tartaric acid, tartronic acid, glyceric acid, and dihydroxypropanedioic acid.

38. The composition of claim 1, wherein the polyanionic polymer compositions comprises 1:1 (by mole) ratio of maleic to itaconic acid repeat units.

39. The composition of claim 1, wherein the composition further comprises a dye.

40. An aqueous liquid composition comprising:
- a polyanionic polymer present at a level of from about 25-45% by weight;
- a boron compound present at a level of from about 3-5% by weight; and
- a boron compound dispersant or solvent present at a level of from about 15-40% by weight, said dispersant or solvent selected from the group consisting of: (1) saturated aliphatic diols, glycols, and mixtures thereof which are essentially free of carbon-carbon double bonds; (2) aliphatic alpha-hydroxy acids essentially free of carbon-carbon double bonds and ring structures; and (3) mixtures of the foregoing,
- wherein all of said weight percentages are based upon the total weight of the composition taken as 100% by weight;
- said polyanionic polymer, boron compound, and boron compound dispersant or solvent, being in aqueous dispersion or solution,
- said composition operable to maintain the boron compound content thereof in stable dispersion or solution for a period of at least about 72 hours at ambient temperature without stirring.

\* \* \* \* \*